US012749702B2

(12) United States Patent
Phares et al.

(10) Patent No.: US 12,749,702 B2
(45) Date of Patent: Sep. 29, 2026

(54) POWDERIZED SOLID-STATE ELECTROLYTE AND ELECTROACTIVE MATERIALS

(71) Applicant: Dragonfly Energy Corp., Reno, NV (US)

(72) Inventors: Denis Phares, Reno, NV (US); Jordan Dargert, Reno, NV (US); Gabriel Stehling Vieira Martins, Houston, TX (US); Vickram Singh, Reno, NV (US); Patrick Stampfli, Reno, NV (US)

(73) Assignee: Dragonfly Energy Corp., Reno, NV (US)

( * ) Notice: Subject to any disclaimer, the term of this patent is extended or adjusted under 35 U.S.C. 154(b) by 638 days.

(21) Appl. No.: 18/161,875

(22) Filed: Jan. 30, 2023

(65) Prior Publication Data

US 2023/0246225 A1 Aug. 3, 2023

Related U.S. Application Data

(63) Continuation of application No. 17/399,444, filed on Aug. 11, 2021, now Pat. No. 12,341,149.
(Continued)

(51) Int. Cl.
*H01M 10/056* (2010.01)
*H01M 4/36* (2006.01)
(Continued)

(52) U.S. Cl.
CPC ......... *H01M 10/056* (2013.01); *H01M 4/364* (2013.01); *H01M 4/623* (2013.01);
(Continued)

(58) Field of Classification Search
CPC ...... H01M 4/366; H01M 4/0419; H01M 4/62; H01M 4/622; H01M 4/364; H01M 10/056
See application file for complete search history.

(56) References Cited

U.S. PATENT DOCUMENTS 6,939,484 B2 9/2005 Dorfman
7,754,382 B2 * 7/2010 Kurihara ................. H01M 4/13 427/79

(Continued)

FOREIGN PATENT DOCUMENTS

CN 104241687 A 12/2014
CN 111253521 A 6/2020

(Continued)

OTHER PUBLICATIONS

Machine translation of WO 2020/059927 (no date) (Year: 0000).*

(Continued)

*Primary Examiner* — Amanda C. Walke
(74) *Attorney, Agent, or Firm* — Wolf, Greenfield & Sacks, P.C.

(57) ABSTRACT

Powderized solid-state electrolytes and electroactive materials as well as related methods of manufacturing and use are disclosed. In one embodiment, an ionically conductive powder comprises a plurality of ionically conductive particles. The ionically conductive particles may comprise an ionically conductive salt dissolved in a thermoplastic polymer, with optional components (e.g., electroactive and/or inorganic solid particles) dispersed within. Related methods of producing these ionically conductive powders are also disclosed including, but not limited to, low-temperature milling, spray drying, and aerosol polymerization. Embodiments related to using the resultant ionically conductive powders in a spray deposition process are also described.

28 Claims, 12 Drawing Sheets

Related U.S. Application Data

(60) Provisional application No. 63/064,449, filed on Aug. 12, 2020.

(51) Int. Cl.
*H01M 4/62* (2006.01)
*B01J 2/06* (2006.01)
*H01M 4/505* (2010.01)
*H01M 4/525* (2010.01)

(52) U.S. Cl.
CPC ................ *B01J 2/06* (2013.01); *H01M 4/505* (2013.01); *H01M 4/525* (2013.01); *H01M 2300/0071* (2013.01); *H01M 2300/0082* (2013.01)

(56) References Cited

U.S. PATENT DOCUMENTS 9,531,033 B2 12/2016 Takahada et al.
10,211,455 B2 2/2019 Pan et al.
10,411,264 B2 * 9/2019 Pan ....................... H01M 4/366
10,483,533 B2 11/2019 Zhamu et al.
10,516,157 B2 12/2019 Ogata et al.
10,655,021 B2 5/2020 Joedicke
10,734,642 B2 8/2020 Zhamu et al.
10,818,926 B2 10/2020 Pan et al.
10,868,296 B2 12/2020 Lee et al.
10,957,910 B2 3/2021 Jang et al.
11,005,094 B2 5/2021 Pan et al.
2004/0018430 A1 1/2004 Holman
2004/0105980 A1 6/2004 Sudarshan et al.
2006/0153972 A1 7/2006 Hirokawa
2007/0082261 A1 4/2007 Lee et al.
2011/0217595 A1 9/2011 Kelnberger et al.
2012/0258359 A1 10/2012 Saka
2013/0071741 A1 3/2013 Ohara et al.
2013/0309414 A1 11/2013 Eskra et al.
2014/0127592 A1 5/2014 Wessells et al.
2018/0219229 A1 8/2018 Miki
2018/0248190 A1 8/2018 Pan et al.
2019/0115591 A1 * 4/2019 Zhamu .................. H01M 4/483
2019/0252668 A1 8/2019 Phares
2020/0067077 A1 2/2020 Pan et al.
2020/0215724 A1 7/2020 Capobianco et al.
2020/0358081 A1 11/2020 Lin et al.
2020/0365880 A1 11/2020 Jang
2021/0167354 A1 6/2021 Phares
2022/0069337 A1 3/2022 Phares et al.
2022/0384909 A1 12/2022 Jang
2023/0170459 A1 * 6/2023 Phares .................. H01M 4/622
429/217

FOREIGN PATENT DOCUMENTS

KR 10-2010-0006409 A 1/2010
WO WO 2018/152173 A1 8/2018
WO WO-2020059927 A1 * 3/2020 .............. H01M 4/36

OTHER PUBLICATIONS

International Search Report and Written Opinion for International Application No. PCT/US2021/045469, mailed Jan. 19, 2022.
Aihara et al., Investigation on solvent-free solid polymer electrolytes for advanced lithium batteries and their performance. Journal of power sources. Feb. 25, 2003;114(1):96-104.
Seki et al., Effect of binder polymer structures used in composite cathodes on interfacial charge transfer processes in lithium polymer batteries. Electrochimica acta. Nov. 30, 2004;50(2-3):379-83.

* cited by examiner

POWDERIZED SOLID-STATE ELECTROLYTE AND ELECTROACTIVE MATERIALS

CROSS-REFERENCE TO RELATED APPLICATIONS

This Application is a Continuation of U.S. application Ser. No. 17/399,444, filed Aug. 11, 2021, which claims the benefit of priority under 35 U.S.C. § 119(e) of U.S. Provisional Application Ser. No. 63/064,449, filed Aug. 12, 2020. The entire contents of these applications are incorporated herein by reference in their entirety.

FIELD

Disclosed embodiments are related to powderized solid-state electrolytes and electroactive materials as well as related methods of manufacturing and use.

BACKGROUND

Lithium ion batteries typically include two or more electrodes separated by an electrically insulating material that is permeable to the diffusion of lithium ions between the electrodes. In some instances, one electrode includes an anode powder material coated onto a copper substrate and the other includes a cathode powder material coated onto an aluminum substrate, though other electrode materials and chemistries are also used. The production of these electrodes is conventionally done using slurry casting methods, in which the electroactive material (e.g. the anode or cathode material) powders are mixed with a polymer binder (e.g. typically polyvinylidene fluoride PVDF) which is dissolved in an appropriate solvent (e.g. typically N-methyl pyrrolidone). The resulting slurry is casted onto the electrode substrate. Subsequently, the solvent is evaporated and reclaimed to form a dried layer of electrochemical material on the electrode surface. Slurry casting has also been used to form solid-state electrolyte using electrolyte slurries. The electrolyte slurries often include a lithium salt solvated in a polymer binder, prepared through dissolution in what is often termed a 'non-solvent' (e.g. typically N-methyl pyrrolidone). Subsequently, the non-solvent is evaporated to form a dried layer of electrolyte material between the electrodes. In order to remove all the solvent from the electrodes and/or electrolyte after slurry casting, enormous amounts of time and energy are expended in the use of large conveyor ovens and vacuum dryers that help to dry the deposited slurry.

SUMMARY

In certain aspects, ionically conductive powders are provided.

In some embodiments, an ionically conductive powder comprises a plurality of ionically conductive particles, wherein at least one of the plurality of ionically conductive particles comprises: a thermoplastic polymer; an ionically conductive salt dissolved in the thermoplastic polymer; and a plurality of inorganic solids and/or electroactive material particles dispersed in the thermoplastic polymer.

In some embodiments, an ionically conductive powder comprises a plurality of ionically conductive particles, wherein at least one of the plurality of ionically conducting particles comprises: a thermoplastic polymer; and an ionically conductive salt dissolved in the thermoplastic polymer, and wherein the at least one of the plurality of ionically conducting particles is substantially free of particulates.

In some embodiments, an ionically conductive powder comprises a plurality of ionically conductive particles, wherein at least one of the plurality of ionically conductive particles comprises: a thermoplastic polymer; an ionically conductive salt dissolved in the thermoplastic polymer; and a plurality of inorganic solid particles dispersed in the thermoplastic polymer, wherein a weight percent of the plurality of inorganic solid particles in the powder is at least 50 wt % of a total weight of the powder.

In certain aspects, methods are provided.

In some embodiments, a method comprises: combining a molten thermoplastic polymer with an ionically conductive salt to form a mixture; dissolving the ionically conductive salt in the molten thermoplastic polymer; solidifying the mixture; and milling the solidified mixture to produce a plurality of ionically conductive particles.

In some embodiments, a method comprises: combining a thermoplastic polymer, an ionically conductive salt, and a solvent to form a mixture; dissolving the ionically conductive salt and thermoplastic polymer in the solvent, and wherein the mixture is substantially free of particulates; and spraying the mixture, wherein the solvent evaporates while the mixture is being sprayed to form a plurality of ionically conductive particles.

In some embodiments, a method comprises: combining a photocurable polymer and/or monomer, a photo-initiator, and an ionically conductive salt to form a mixture; dissolving the ionically conductive salt and the photo-initiator in the photocurable polymer and/or monomer; spraying the mixture; and exposing the spray to electromagnetic radiation to cure the photocurable polymer and/or monomer and form a plurality of ionically conductive particles.

In some embodiments, a method comprises: spraying a plurality of ionically conductive particles; applying a charge to the spray of ionically conductive particles; heating a substrate; and applying the charged spray of ionically conductive particles to the heated substrate to form a film of the ionically conductive particles on the substrate.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 4A shows a schematic representation associated with direct dissolution of materials in molten polymer; FIG. 4B shows a schematic representation associated with a low-temperature milling process using a ball mill.

FIG. 10A shows a SEM image of the plurality of ionically conductive particles and FIGS. 10B-10E show SEM-EDS images of fluorine (FIG. 10B), cobalt (FIG. 10C), manganese (FIG. 10D), and nickel (FIG. 10E) distribution in the plurality of ionically conductive particles.

DETAILED DESCRIPTION

Figure 1:
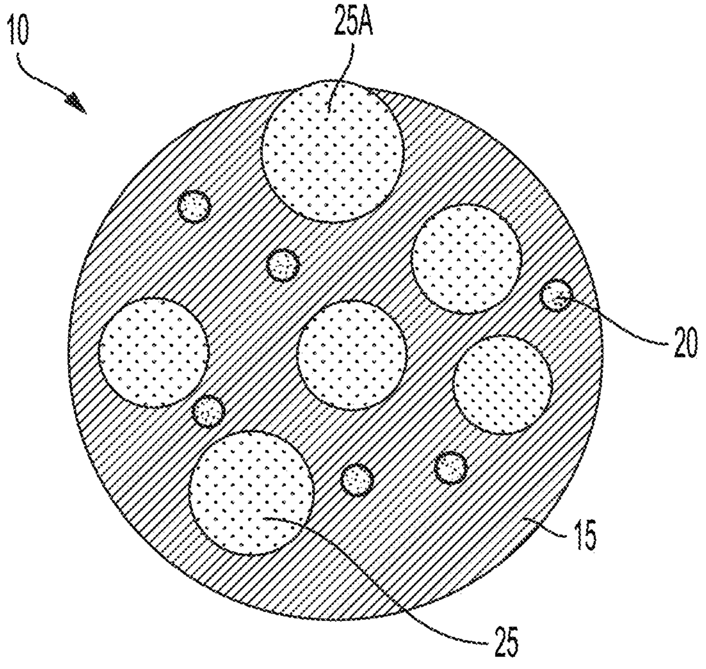
FIG. 1 shows a schematic representation of an ionically conductive particle, according to certain embodiments.

The Inventors have recognized that deposition methods where a separate particle and binder are combined and then deposited during a deposition process may lead to extra complexity and, in some instances, non-uniformity in the deposited materials. Thus, the Inventors have recognized that in some applications it may be desirable to decrease the complexity of a deposition process as well as increase the uniformity of the deposited materials. Accordingly, in some embodiments, a powder that is substantially free from a solvent may be deposited. Some prior methods for making electrode materials have used supercritical carbon dioxide as a solvent to dissolve a binder and form a coating of a binder on the electroactive particles. However, upon evaporation of supercritical carbon dioxide, the binder forms a thin and uniform layer of individual binder particles deposited on the surface of the core electroactive particle. Additionally, supercritical carbon dioxide may exhibit lower solubility limits for the solvation of certain salts, e.g., lithium salt, and thus may have limited use for production of electrolyte powders including larger concentrations of solvated salts.

In view of the above, the inventors have recognized the need for improved electrolyte and electrode powders for use in spray deposition of solid-state battery manufacturing technologies. Additionally, due to residual solvent and/or moisture associated with typical manufacturing methods leading to reduced battery life, e.g., faster degradation of electrochemical cell, the Inventors have recognized the benefits associated with the preparation of spray deposition materials that exhibit substantially reduced amounts of residual solvent and moisture in them.

Another limitation the inventors have recognized associated with the typical manufacturing methods, such as slurry casting, is the limited selection of compositions from which the electrolyte slurries can be made from. For instance, typical electrolytes may contain components such as binder, salts, inorganic solids (e.g., ionically conductive ceramics and/or glasses as well as non-ionically conductive ceramics and/or glasses), or other additives, e.g., a plasticizer. During deposition of the electrolyte slurries onto the electrodes, the electrolyte slurries need to have a suitable range of composition to ensure that a standing electrolyte film/layer can be formed. In some cases, a standing film cannot be formed with an inorganic solid content greater than 50 wt % using a slurry casting method. Operating outside of the compositional range may lead to non-uniform distribution of a particular component, as well as manufacturing failure of the solid-state battery. In addition, the evaporation of a solvent from electrolyte slurries make it difficult to maintain solvation of additives or salts during manufacturing, which can result in poor conductive properties of the electrochemical cell. In view of the above discussed problems, the Inventors have recognized that there is a need for development of electrolyte and/or electrode powders for use in powder coating technologies for spray deposition-based manufacturing methods of electrochemical devices.

In view of the above, the Inventors have recognized the benefits associated with an ionically conductive powder comprising a plurality of ionically conductive particles which may be used in powder spray coating processes. In some cases, the ionically conductive powder may be an electrolyte powder, e.g., a powder that is capable of facilitating transport of ionic species between the electrodes, e.g., anode and cathode. In some cases, the ionically conductive powder may be an electrode powder, e.g., a powder comprising electroactive materials that can be used to form the electrodes. In some embodiments, at least one, a majority, or substantially all of the plurality of ionically conductive particles comprise a thermoplastic polymer and an ionically conductive salt dissolved in the thermoplastic polymer. Depending on the embodiment, at least one, a majority, or substantially all, of the plurality of ionically conductive particles may exhibit a continuous structure with a continuous phase comprising the thermoplastic polymer and an ionically conductive salt solvated and distributed uniformly within the thermoplastic polymer.

In some embodiments, at least one, a majority, or substantially all, of the plurality of ionically conductive particles are substantially free of particulates. The term "particulates", as used herein, may refer to any components or species that is incapable of being dissolved, or have reached a solubility limit, in a given continuous phase. For example, according to one set of embodiments, the plurality of ionically conductive particles comprising one or more solvated salts in one or more thermoplastic polymers may include less than or equal to 10 weight percent (wt %), 5 wt %, 1 wt %, 0.5 wt %, 0.1 wt %, or any other appropriate weight percentage of particulates dispersed in the ionically conductive particles.

In another embodiment, at least one, a majority, or substantially all, of the plurality of ionically conductive particles included in a powder may include a thermoplastic polymer and an ionically conductive salt dissolved in the thermoplastic polymer with a plurality of inorganic solids (e.g., ceramic or glass particles) and/or electroactive material particles dispersed in the thermoplastic polymer. In some such embodiments, the plurality of ionically conductive particles may comprise a continuous phase of the thermoplastic polymer with the dissolved ionically conductive salts and a dispersed phase comprising inorganic solids and/or electroactive material particles suspended in the continuous thermoplastic polymer phase. In some instances, the particles suspended within the continuous thermoplastic polymer phase may be uniformly dispersed within the thermoplastic polymer.

In one set of embodiments, at least one, a majority, or substantially all, of the plurality of ionically conductive particles included in a powder may include a thermoplastic polymer and an ionically conductive salt dissolved in the thermoplastic polymer with a plurality of inorganic solids (e.g., ceramic or glass particles). The inorganic solids, as described in more detail below, may comprise non-lithiated inorganic solids (i.e., inorganic solids lacking lithium atoms) and/or may be present in a relatively high amount in the overall powder and/or dispersed in the thermoplastic polymer using any of the percentages disclosed herein for these materials.

It should be understood that any appropriate additional components may also be included in the ionically conducting powders disclosed herein. For instance, non-limiting examples of additional components that may be included in the ionically conducting powders described herein may include, but are not limited to: additives such as plasticizers (e.g., succinonitrile (SN), glutaronitrile (GN), ethylene carbonate (EC), etc.); and/or any other appropriate material.

As noted above, the various ionically conducting powders disclosed herein may include ionically conducting particles with the described structures and ranges of compositions described herein in any appropriate weight percent (wt. %) of the total powder weight. For example, at least one, a majority, or substantially all of the plurality of ionically conductive particles included in a powder may exhibit the disclosed combinations of materials and ranges of compositions. The range of particles exhibiting the disclosed compositions may be present in a weight percentage of at least 50 wt. %, at least 60 wt. %, least 70 wt. %, at least 80 wt. %, at least 90 wt. %, at least 99 wt. %, 99.9 wt. %, and/or any other appropriate weight percentage.

Certain aspects of the disclosure are related to methods of producing a plurality of ionically conductive particles, e.g., for use as either electrolyte and/or electrode powders in solid-state lithium ion battery manufacturing. While various embodiments herein are described as producing and/or using the plurality of ionically conductive particles as either the electrolyte and/or the electrode powders in solid-state lithium ion battery manufacturing, it should be understood that the disclosure is not so limited, and that in certain embodiments, the plurality of ionically conductive particles may be produced and/or used as either the electrolyte and/or the electrode powders in the manufacturing of other types of solid-state batteries, e.g., such as in sodium-ion battery manufacturing.

In one set of embodiments, a method of producing a plurality of ionically conductive particles involving low-temperature milling is provided herein. Certain embodiments comprise first combining a molten thermoplastic polymer with an ionically conductive salt to form a mixture. The ionically conductive salt may be dissolved in the molten thermoplastic polymer. Depending on the application, the thermoplastic polymer may be substantially free of particulates, e.g., undissolved ionically conductive salt, inorganic solids (e.g., ceramic or glass particles), and electroactive material particles. Alternatively, in some embodiments, any undissolved ionically conductive salt particles, inorganic solids, and/or electroactive material particles may be dispersed into the molten thermoplastic polymer prior to solidifying the mixture. Other additives (e.g. a plasticizer, etc.) may be added to the mixture. In either case, the mixture may be cooled to allow solidification of the mixture. In accordance with certain embodiments, the solidified mixture is milled in a mill (e.g. ball mill, cryo-mill, rotor mill, knife mill, jet mill, etc.) to produce a plurality of ionically conductive particles as described herein.

In one set of embodiments, a method of producing a plurality of ionically conductive particles comprises spraying drying. In some embodiments, a thermoplastic polymer may be first combined with an ionically conductive salt to form a mixture. Certain embodiments comprise a co-dissolution process that involves dissolving both the ionically conductive salt and thermoplastic polymer in a solvent. As used herein, "solvent" refers to a liquid that may be capable of dissolving more than a trace amount of the ionically conductive salt and/or thermoplastic polymer. For example, in some embodiments, a solvent may be present in an amount and the salt and thermoplastic polymer may have sufficient solubility in the solvent such that a majority of the salt and thermoplastic polymer (e.g. greater than 50 wt %), and in some instances substantially all (e.g. greater than 90 wt %, 95 wt %, 99 wt %, or other appropriate percentage) of the salt and thermoplastic polymer may be dissolved in the solvent. Optionally, particulates such as inorganic solids and/or electroactive material particles may be suspended in the resulting solution. The mixture is then sprayed and the solvent is evaporated during the spraying process to form a plurality of ionically conductive particles. The resultant plurality of ionically conductive particles may comprise a thermoplastic polymer with a dissolved ionically conductive salt that is either substantially free of particles or that includes particles that are dispersed in a continuous phase of the thermoplastic polymer. Similar to the other embodiments described herein, additives (e.g., a plasticizer) may also be added to the mixture prior to spraying.

In one set of embodiments, it may be desirable to combine an aerosol photopolymerization process with a spray drying process disclosed herein to form a plurality of ionically conductive particles. In such an embodiment, when forming a mixture, instead of dissolving a thermoplastic polymer in a solvent, a photocurable polymer, a photo-initiator and an ionically conductive salt may be added to a mixture. In some instances, the ionically conductive salt and the photo-initiator may be dissolved in the photocurable polymer and a solvent, inorganic solids, electroactive material particles, and/or other additives may optionally be added to the mixture. Similar to the above noted embodiment, the mixture is then sprayed or aerosolized into droplets that can be subsequently photo-polymerized. For instance, by subjecting the sprayed mixture to electromagnetic radiation, the photocurable polymer within each spray droplets can be photo-crosslinked to form a plurality of ionically conductive particles. The resultant plurality of ionically conductive particles comprises a continuous phase of photo-crosslinked polymers that comprises dissolved salts and optionally inorganic solids, electroactive material particles, and/or other additives.

In instances where a solvent is included in a process using photo-polymerization as the mixture is sprayed, the solvent is evaporated and the sprayed droplet is exposed to electromagnetic radiation. Depending on the size of the droplets, a temperature of the process, and other appropriate operating parameters, the evaporation of the solvent may either occur prior to, simultaneously with, and/or after exposure of the plurality of ionically conductive particles to the electromagnetic radiation.

In some embodiments, the plurality of the ionically conductive particles described herein may have an average maximum cross-sectional dimension, e.g., diameter, of less than or equal to 250 μm. It should be noted that the average maximum cross-section dimension of the plurality of ionically conductive particles may be any average, e.g., such as number-based average, of the plurality of ionically conductive particles. For instance, an average maximum cross-sectional dimension of the plurality of ionically conductive particles may be at least 1 μm, at least 5 μm, at least 10 μm, at least 20 μm, at least 40 μm, at least 60, at least 80, at least 100 μm, at least 200 μm, at least 300 μm, at least 400 μm, at least 600 μm, or at least 800 μm. In some embodiments, the average maximum cross-sectional dimension of the plurality of ionically conductive particles is less than or equal to 1 mm, less than or equal to 900 μm, less than or equal to 700 μm, less than or equal to 500 μm, less than or equal to 350 μm, less than or equal to 250 μm, less than or equal to 200 μm, less than or equal to 150 μm, less than or equal to 100 μm, less than or equal to 50 μm, less than or equal to 25 μm, less than or equal to 15 μm, or less than or equal to 5 μm. Combination of the above-referenced ranges are also possible (e.g., at least 1 μm and less than or equal to 250 μm, or at least 20 μm and less than or equal to 100 μm). Other values are also possible. For instance, the ionically conductive particle may have any appropriate size, as long as standing (e.g., structurally stable) films of electrolyte or electrode can be formed using the particles during the powder spray deposition process and that the conductive property of the resultant films is not adversely affected.

In some embodiments, the plurality of ionically conductive particles comprises a solvent and/or moisture content of less than or equal to 0.5 wt %. As mentioned, a high amount of residual solvent and/or moisture content may adversely affect battery life by leading to rapid degradation of the electrochemical cell. In some embodiments, the plurality of ionically conductive particles may advantageously comprise a solvent and/or moisture content of less than or equal to 5 wt %, less than or equal to 4 wt %, less than or equal to 3 wt %, less than or equal to 2 wt %, less than or equal to 1.5 wt %, less than or equal to 1.0 wt %, less than or equal to 0.5 wt %, less than or equal to 0.3 wt %, less than or equal to 0.2 wt %, less than or equal to 0.1 wt %, less than or equal to 0.05 wt %, or less than or equal to 0.01 wt %. The residual solvent described herein may refer to any leftover solvent that is used to solvate any components, e.g., the thermoplastic polymer and/or ionically conductive salt, in any of the aforementioned methods of producing the ionically conductive particles. The residual moisture may refer to the final amount of water contained within the ionically conductive particles produced using any of the aforementioned methods.

In some embodiments, the plurality of ionically conductive particles are substantially homogeneous in at least one of size, shape, or mass. In some embodiments, the plurality of ionically conductive particles are substantially homogeneous in size. For instance, the plurality of ionically conductive particles may comprise a polydispersity index (PDI) of less than or equal to 0.7, less than or equal to 0.6, less than or equal to 0.5, less than or equal to 0.4, less than or equal to 0.3, less than or equal to 0.2, less than or equal to 0.1, less than or equal to 0.05, less than or equal to 0.02, or any other appropriate index number including indices both greater and less than those noted above. The polydispersity index is generally described as the square of standard deviation of the particle size over an average particle size. Advantageously, the plurality of ionically conductive particles may be substantially homogenous, e.g., having a relatively low polydispersity in size, shape, or mass, such that the particles can be arranged to form electrode and/or electrolyte layers that are substantially homogeneous and uniform.

As mentioned, the plurality of ionically conductive particles may comprise a plurality of solvated and/or dispersed components in the continuous phase comprising a thermoplastic polymer. In some such embodiments, the solvated components comprise one or more dissolved ionically conductive salts and/or one or more dissolved additives, and the dispersed components comprises particulates such as inorganic solids, electroactive material particles, or particulate additives. In a specific set of embodiments, the ionically conductive powder is an electrolyte powder that comprises a plurality of ionically conductive particles comprising dissolved ionically conductive salt in a thermoplastic polymer, and optionally dispersed inorganic solids and/or additives (e.g., plasticizer) in the thermoplastic polymer. In some embodiments, the ionically conductive powder is an electrode powder that comprises a plurality of ionically conductive particles comprising electroactive material particles dispersed in a thermoplastic polymer including a dissolved ionically conductive salt, and optionally dispersed inorganic solids and/or additives (e.g., plasticizer) in the thermoplastic polymer.

Appropriate types of thermoplastic polymers that may be used to form the plurality of ionically conductive particles described herein, include, but are not limited to, any appropriate thermoplastic polymer. Additionally, it should be noted that the deposition of material layers without the use of a solvent using the ionically conductive particles described herein may enable the use of thermoplastic polymers that may improve properties of a resulting electrochemical cell, but that are not typically used in solvent based slurry casting processes. For example, thermoplastic polymers that are more ionically and/or electronically conductive than typical thermoplastic polymers, but that are not easily soluble in typical solvents, may be used to form the ionically conductive particles. According to certain embodiments, appropriate polymers may include, but are not limited to polyvinylidene fluoride (PVDF), poly(vinylidene fluoride-co-hexafluoropropylene) (PVDF-HFP), polyethylene glycol (PEG), polyvinyl acetate (PVA), polytetrafluoroethylene (PTFE), styrene-butadiene (SBR), polyethylene oxide (PEO), polyacetylene, polyphenylene, polypyrrole, polythiophene, polyaniline, polyphenylene sulfide, poly(vinyl alcohol) (PVOH or PVA); polyethylenimine (PEI); poly (vinylpyrrolidone) (PVP), carbonate-based polymers (e.g., poly(ethylene carbonate) (PEC), poly(propylene carbonate) (PPC), etc.), and/or combinations of the above. In some instances, at least two or more polymers may be combined to form polymer blends. In some cases, the at least two or more polymers may comprise any of the thermoplastic polymers described herein. In one set of embodiments, the polymer blend may include one or more of a carbonate-based polymer.

Additionally or alternatively, in some cases, the thermoplastic polymer may comprise any suitable copolymers, e.g., including but not limited to, PVDE-HFP, poly(acrylonitrile-butadiene-styrene) (ABS), poly(ethylene-co-vinyl acetate) (PEVAc), poly(ethylene oxide-co-epichlorohydrin) (PEO-EPI), poly(styrene-co-ethylene oxide) (PS-EO), etc. In some instances, copolymers may also consist of a mixture of polymers having similar chemistries but different molecular weights (e.g. PEG 4,000 g/mol mixed with PEG 35,000 g/mol).

Any suitable amounts of thermoplastic polymer may be used to form the plurality of ionically conductive particles described herein. The specific amount may depend on the type and amount of dissolved or dispersed component present in the ionically conductive particles such that the thermoplastic polymer accounts for a remaining weight percent of the ionically conducting particles after the weight percentages of the other components are accounted for. That said, in some embodiments, a weight percentage (wt %) of a thermoplastic polymer within the ionically conducting particles may be less than or equal to 95 wt %, 90 wt %, 80 wt %, 70 wt %, 60 wt %, 50 wt %, 40 wt %, 30 wt %, 20 wt %, 10 wt %, and/or any other appropriate weight percentage. Correspondingly, a weight percent of the thermoplastic polymer within the ionically conducting particles may be greater than or equal to 10 wt %, 20 wt %, 30 wt %, 40 wt %, 50 wt %, 60 wt %, 70 wt %, 80 wt %, 90 wt %, and/or any other appropriate weight percentage. Combinations of the foregoing are contemplated including weight percentages of the thermoplastic polymer that are between or equal to 40 wt % and 95 wt %. However, weight percentages of a thermoplastic polymer within a plurality of ionically conducting particles both greater than and less than those noted above are also contemplated as the disclosure is not so limited. Any appropriate types and amounts of ionically conductive salt may be used to form the plurality of ionically conductive particles. Depending on the particular thermoplastic polymer being used, it may be desirable to increase the ionic conductivity of the thermoplastic polymer being used. Accordingly, an ionically conductive salt may be dissolved in the thermoplastic polymer. In one such embodiment, a lithium salt may be dissolved in the thermoplastic polymer. In such an embodiment, the thermoplastic polymers may correspond to any of the polymers noted herein and may include a lithium salt dissolved therein. Appropriate lithium salts include, but are not limited to, $LiNO_3$, LiCl, LiI, $LiClO_4$, $LiBF_4$, $LiPF_6$, $LiAsF_6$, LiFSI, LiTFSI, LiBETI, LiCTFSI, LiBOB, LiDFOB, LiTDI, LiPDI, LiDCTA, and $LiB(CN)_4$. In one specific embodiment, a lithium salt (LiX) may be dissolved in PEO to form PEOLiX. In one specific embodiment, a lithium salt (e.g., LiFTSI) may be dissolved in PVDF-HFP. Of course, other types of salts as well as the inclusion of non-lithium based salts may be used depending on the particular chemistry of an electrochemical cell with the materials are used to form. For example, in some embodiments, sodium based salts (e.g., NaI, etc.) may be employed.

In some embodiments, an ionically conductive salt having a relatively low molecular weight and/or comprising a relatively small anion may be employed. Compared to ionically conductive salts having a relatively high molecular weight and/or a relatively large anion, such an ionically conductive salt may exhibit improved material compatibility with the thermoplastic polymers, thereby resulting in the formation of a powder having enhanced chemical and structural stability. Without wishing to be bound by theory, it is believed that such lithium salts, by having smaller anion components and/or lower molecular weights compared to their larger counterparts, can more favorably interact with the thermoplastic polymers and thereby improve the stability of the thermoplastic polymers (e.g., carbonate-based polymers) in the powder. In some embodiments, such an ionically conductive salt may have a relatively low molecular weight of less than or equal to 150 g/mol, 125 g/mol, 100 g/mol, 80 g/mol, 70 g/mol, 60 g/mol, 50 g/mol, 40 g/mol, 30 g/mol, and/or any other appropriate molecular weight. In some embodiments, an ionically conductive salt having a relatively low molecular weight may have a molecular weight of greater than or equal 20 g/mol, 30 g/mol, 40 g/mol, 50 g/mol, 60 g/mol, 70 g/mol, 80 g/mol, 90 g/mol, 100 g/mol, 125 g/mol, and/or any other appreciate molecular weight. Combinations of the above recited ranges are also possible (e.g., greater than or equal to 20 mol/g and less than or equal to 150 mol/g). Examples of ionically conductive salt having a relatively low molecule include, but are not limited to, $LiNO_3$, LiI, LiCl, $LiClO_4$, $LiBF_4$, etc.

According to certain embodiments, the ionically conductive salt may be present at an amount of at least 5 wt % of a total weight of the ionically conductive powder. That said, any appropriate amount of ionically conductive salt may be present in any appropriate form. For example, a weight percentage of a salt may be selected such that the ionically conductive salt is either fully dissolved in a thermoplastic polymer, supersaturated in the thermoplastic polymer, and/or fully saturated in the thermoplastic polymer with particles of the ionically conducting salt uniformly dispersed within the thermoplastic polymer. In either case, the amount of ionically conductive salt may be adjusted accordingly based on its solubility in the solvent and for a desired application. For instance, the ionically conductive salt may be present in an amount of at least 1 wt %, at least 2 wt %, at least 5 wt %, at least 10 wt %, at least 20 wt %, at least 30 wt %, at least 40 wt %, at least 50 wt %, at least 60 wt %, at least 70 wt % of a total weight of the powder. In some embodiments, the ionically conductive salt is present in an amount of less than or equal to 75 wt %, less than or equal to 65 wt %, less than or equal to 55 wt %, less than or equal to 45 wt %, less than or equal to 35 wt %, less than or equal to 25 wt %, less than or equal to 15 wt %, less than or equal to 5 wt %, less than or equal to 3 wt %, less than or equal to 1.5 wt %, less than or equal to 0.5 wt %, or less than or equal to 0.1 wt % of the total weight of the powder. Combination of the above-referenced ranges are also possible (e.g., at least 5 wt % and less than or equal to 50 wt %, or at least 50 wt % and less than or equal to 75 wt %). Other values are also possible including ranges both greater than and less than those noted above.

In some embodiments, the ionically conductive salt may be present in a relatively high amount in the thermoplastic polymer. In some embodiments, the ionically conductive salt may be present in an amount of greater than or equal to 40 wt %, greater than or equal to 50 wt %, greater than or equal to 60 wt %, greater than or equal to 70 wt %, or greater than or equal to 80 wt % relative to the total weight of the thermoplastic polymer. In some embodiments, the ionically conductive salt may be present in an amount of less than or equal to 90 wt %, less than or equal to 80 wt %, less than or equal to 70 wt %, less than or equal to 60 wt %, or less than or equal to 50 wt % relative to the total weight of the thermoplastic polymer. Combination of the above-referenced ranges are possible (e.g., greater than or equal to 50 wt % and less than or equal to 80 wt %). Other ranges are also possible.

As mentioned, in accordance with certain embodiments, a plurality of ionically conductive particles may also comprise a plurality of inorganic solids (e.g., ceramic or glasses) and/or electroactive material particles dispersed in a continuous phase of the thermoplastic polymer forming the individual ionically conductive particles. According to some such embodiments, the plurality of inorganic solids and/or electroactive material particles are uniformly dispersed in the thermoplastic polymer, e.g., such that little to no particle agglomeration exist. In some such instances, the number of particles (e.g., inorganic solids and/or electroactive material particles) per unit volume of an ionically conductive particle may be substantially the same. During fabrication of the ionically conductive particles, mechanical force, e.g., agitation/mixing, may be applied to uniformly disperse of the plurality of inorganic solids and/or electroactive material particles in the thermoplastic polymer.

It should be noted that the plurality of inorganic solids disclosed herein may comprise one or more selected from the group of ionically conductive or non-ionically conductive ceramics and/or glasses. In some instances, the plurality of inorganic solids may comprise ionically conductive material that can advantageously facilitate ion transport between the electrodes in an electrochemical cell. For instance, ionically conductive ceramics or glasses may be used in the ionically conductive powders described herein (e.g., electrolyte and electrode powder) to facilitate ion transport in the resultant electrolyte or electrode layers. In view of the above, possible ionically conductive materials may include ceramics such as one or more ionically conductive metal oxides, and/or metal oxides that facilitate the transport of ions through the inorganic solids and/or along an interface with a surrounding thermoplastic polymer matrix. These materials may include, but are not limited to, at least one of $Al_2O_3$, $SiO_2$, $TiO_2$, MgO, ZnO, $ZrO_2$, CuO, CdO, $Li_7La_3Zr_2O_{12}$ (LLZO), and $Li_2O$. Alternatively, and/or in combination with the noted metal oxides, the ionically conducting material may also include an ionically conductive glass such as one or more of $Li_2S$, $P_2S_5$, and $xLi_2S-(1-x)P_2S_5$. While particular types of ionically conductive materials have been listed above it should be understood that any appropriate ionically conductive material may be used as the disclosure is not limited to only these materials. In some embodiment, the plurality of inorganic solids may comprise non-ionically conductive ceramics or glass. In some such embodiments, the non-ionically conductive inorganic solids (e.g. ceramics and/or glasses) may be used to provide structural integrity to a layer which may be advantageous in applications such as solid electrolyte layers and/or separator layers in an electrochemical cell. Of course, it should be understood that ionically conducting and non-ionically conducting inorganic solids are not limited to being used in any particular application.

In some embodiments, the plurality of inorganic solids, which may include a plurality of inorganic solid particles, disclosed herein comprises lithium-ion conducting additives. For example, the lithium-ion conducting additives may comprise one or more selected from the group of non-lithiated inorganic solids (e.g., non-lithiated ceramics and/or non-lithiated glasses). In some such embodiments, a non-lithiated inorganic solid refers to an inorganic solid that lacks lithium atoms. Advantageously, the presence of such non-lithiated inorganic solids may result in the formation of ionically conductive powders having enhanced lithium ion conductivities. In some embodiments, the non-lithiated inorganic solids comprise ionically conductive non-lithiated ceramics (e.g., metal oxides) and/or ionically conductive non-lithiated glass. Examples of such non-lithiated inorganic solids include, but are not limited to, $Al_2O_3$, $SiO_2$, $TiO_2$, MgO, ZnO, $ZrO_2$, CuO, CdO, $P_2S_5$, or combination thereof. While various embodiments herein are directed to lithium-ion conducting additives comprising non-lithiated inorganic solids, it should be understood that the disclosure is not so limited, and that in certain embodiments, the lithium-ion conducting additives may comprise lithiated inorganic solids (e.g., lithiated ceramics and/or lithiated glasses). For example, in some cases, the lithiated inorganic solid comprises a ceramic such as $Li_7La_3Zr_2O_{12}$ (LLZO).

According to certain embodiments, the ionically conductive powder comprises a substantial amount of the plurality of inorganic solids (e.g., Li-ion conducting and/or non-lithiated ceramics and/or glass) described herein. Any appropriate amount of inorganic solids may be present in the powder, such that the powder has a certain desired ionic conductivity or other desirable property. For instance, a weight percent (wt %) of the plurality of inorganic solids in the powder may be at least 10 wt %, at least 20 wt %, at least 30 wt %, at least 40 wt %, at least 50 wt %, at least 60 wt %, at least 70 wt %, or at least 80 wt % of a total weight of the powder. In some embodiments, a weight percent (wt %) of the plurality of inorganic solids in the powder less than or equal to 75 wt %, less than or equal to 65 wt %, less than or equal to 55 wt %, less than or equal to 45 wt %, less than or equal to 35 wt %, less than or equal to 25 wt %, less than or equal to 15 wt %, less than or equal to 5 wt %, or less than or equal to 1 wt % of the total weight of the powder. Combination of the above-referenced ranges are also possible (e.g., at least 50 wt % and less than or equal to 70 wt %, or at least 10 wt % and less than or equal to 75 wt %). Other values both greater than and less than those noted above are also possible. Additionally, it is noted that weight percentages of inorganic solids greater than about 50 wt % which may be achieved using the methods and materials described herein may be difficult or impossible to obtain using typical manufacturing methods such as slurry casting. It should also be noted that the presence of a relatively larger amount of (e.g., at least 50 wt %) of ionically conductive inorganic solids may advantageously result in the formation of a powder (e.g., solid electrolyte powder) having enhanced lithium ion conductivity.

It should be understood that the above weight percentages refer to the weight percentages in a final powder including the ionically conducting particles. Accordingly, during manufacturing, different weight percentages may be present in a mixture if a solvent is used. For example, in some instances, a plurality of inorganic solids is present at an amount of greater than or equal to 60 wt % of a mixture that is used to form the ionically conductive powder comprising the plurality of ionically conductive particles. It should be noted that any amount of inorganic solids may be present in the mixture, as long as the amount (wt %) of inorganic solids in the resultant ionically conductive powder falls within the aforementioned ranges. It should be noted that the same holds true for all other components in the mixture, e.g., ionically conductive salt, thermoplastic polymer, electroactive material particles, additives. These components may be present at any amount (wt %) in the mixture, as long as the wt % of the respective components in the resultant ionically conductive powder falls within the ranges described elsewhere herein.

The plurality of inorganic solids described herein may be provided as a plurality of particles in some embodiments and the particles may have any suitable particle size. For instance, an average maximum cross-sectional dimension of the plurality of inorganic solids may be less than or equal to 100 μm, less than or equal to 80 μm, less than or equal to 60 μm, less than or equal to 40 μm, less than or equal to 20 μm, less than or equal to 10 μm, or less than or equal to 5 μm. Correspondingly, the average maximum cross-sectional dimension of the plurality of inorganic solids may be greater than or equal to 1 μm, 5 μm, 10 μm, 20 μm, 40 μm, 60 μm, 80 μm, and/or any other appropriate range. Combinations of the foregoing are contemplated including, for example, an average maximum cross-sectional dimension of the plurality of inorganic solids that is between or equal to 1 μm and 100 μm. Other values are also possible including dimensions both greater than and less than those noted above.

As mentioned, in accordance with certain embodiments, the plurality of ionically conductive particles may comprise a plurality of electroactive material particles dispersed in a thermoplastic polymer. In a specific embodiment, an average maximum cross-sectional dimension of the plurality of electroactive material particles is less than or equal to 30 μm. However, the electroactive material particles may have any suitable particle size. For instance, an average maximum cross-sectional dimension of the plurality of electroactive material particles may be less than or equal to less than or equal to 100 μm, less than or equal to 70 μm, less than or equal to 50 μm, less than or equal to 30 μm, or less than or equal to 20 μm. Correspondingly, an average maximum cross-sectional dimension of the electroactive material particles may be greater than or equal to 10 μm, 20 μm, 30 μm, 40 μm, 50 μm, and/or any other appropriate range. Combinations of foregoing are contemplated including, for example, an average maximum cross-sectional dimension of the electroactive material particles that is between or equal to 10 μm and 100 μm. Other values are also possible.

In certain embodiments, the electroactive material particles comprise one or more electroactive materials. For instance, possible electroactive materials include, but are not limited to, lithium cobalt oxide (LCO), lithium nickel manganese cobalt oxide (NMC), lithium manganese cobalt oxide (LMCO), lithium iron phosphate (LFP), lithium manganese iron phosphate (LMFP), lithium nickel cobalt aluminum oxide (NCA), lithium titanate (LTO), lithium manganese oxide (LMO), lithium manganese nickel oxide (LMNO), graphite, silicon, sulfur, Prussian Blue (i.e., PB or $A_xFe[Fe(CN)_6]$, where A is an alkali metal), Prussian Blue analogs (i.e., PBA or $A_xMA_y[MB(CN)_6]_z \cdot nH_2O$, where MA and MB are transition metals typically selected from the group of Mn, Fe Co, Ni, Cu, and Zn, and A is typically selected from the group of Li, Na, or K), Prussian White (i.e., PW or $Na_2CoFe(CN)_6$), and/or combinations thereof. While particular types of electroactive materials have been listed above it should be understood that any appropriate electroactive material may be used as the disclosure is not limited to only these materials.

In some embodiments, the electroactive material particles may include one or more of the above-mentioned electroactive materials that may be particularly advantageous for use as electrolyte and/or electrode powders in a solid-state sodium ion battery. In some such embodiments, the electroactive material particles may comprise sodium based electroactive materials (e.g., materials comprising a sodium atom). In embodiments in which the battery is a sodium ion battery, the electroactive material particles (e.g., cathode powders) may include one or more of electroactive materials (e.g., cathode electroactive materials) selected from the group of Prussian Blue, Prussian Blue analogs, and Prussian White. In some embodiments, the one or more of electroactive materials selected from the group of Prussian Blue, Prussian Blue analogs, and Prussian White comprise sodium (e.g., where A stands for Na in $A_xFe[Fe(CN)_6]$, $A_xMA_y[MB(CN)_6]z\ nH_2O$, etc.).

In some embodiments, at least one of the plurality of ionically conductive particles comprises one or more additives. In some embodiments, the one or more additives are dissolved or dispersed in the thermoplastic polymer. In some such embodiments, the one of more additives comprises a plasticizer. Non-limiting examples of a plasticizer include, but is not limited to succinonitrile (SN), glutaronitrile (GN), etc. For instance, an additive such as a plasticizer may be introduced to the thermoplastic polymer to increase the plasticity or reduce the viscosity of the thermoplastic polymer, e.g., for ease of handling during manufacturing. Any suitable amount of additives may be present in the plurality of ionically conductive particles. For instance, additives may be present in an amount of at least 10 wt %, at least 20 wt %, at least 30 wt %, at least of a total weight of the powder. In some embodiments, additives may be present in an amount of less than or equal to 40 wt %, less than or equal to 30 wt %, less than or equal to 20 wt %, less than or equal to 10 wt %, or less than or equal to 5 wt % of the total weight of the powder. Of course, weight percentages of an additive both greater than and less than those noted above are also contemplated.

As noted above, certain embodiments include dissolving the ionically conductive salt and thermoplastic polymer in a solvent via a co-dissolution process. It should be understood that any appropriate type of solvent may be used to dissolve the thermoplastic polymer and ionically conductive salt. For example, depending on the specific salt and polymer used, non-limiting examples of a solvent may include, but are not limited to, acetone, DMSO, DMF, acetonitrile, ethanol, methanol, deionized water, etc. In some embodiments, a solvent need to be able to dissolve the polymer and salt at necessary concentrations and evaporate at a necessary rate to prevent re-crystallization of the ionically conductive salt. For instance, a solvent (e.g., N, N-DMF) may be more favorable in co-dissolving a salt (e.g., LiBOB) and a thermoplastic polymer compared to another solvent (e.g., acetone), such that an appropriate evaporation rate may be achieved during drying to prevent re-crystallization of the salt. In some cases, the solvent may be advantageously selected to achieve an appropriate rate of solvent evaporation (e.g., not too fast or slow) to prevent crystallization of salts, such that the salt may be uniformly distributed across the ionically conductive particle during spray drying. In one specific embodiments, LiTFSI and PVDF-co-HFP may be co-dissolved in acetone. In view of the above, it should be understood that in some embodiments, the solvent used in the various embodiments described herein may be a liquid solvent.

In embodiments using photocuring of the ionically conductive particles, the photocurable polymer may be selected based on its solubility for a given photoinitiator and/or ionically conductive salt. Any suitable photocurable polymers and/or monomers may be used. For instance, non-limiting examples of photocurable monomer include, but are not limited to, acrylic acid, acrylonitrile, vinyl acetate, methacrylate, methacrylic acid, ethylene oxide, ethylene glycol, N,N-dimethylacrylamide, 2-hydroxyethyl methacrylate, 4-vinylpyridine, 2-hydroxyethyl acrylate (HEA), N,N-dimethylaminoethyl methacrylate, quaternary ammonium compounds, and derivatives thereof. Quaternary ammonium compounds are cationic compounds that have a protonated basic nitrogen atom, or include quaternary nitrogen atoms. Exemplary quaternary ammonium compounds include N,N-dimethylaminoethyl acrylate, N,N-dimethylaminoethyl methacrylate, allylamine, vinylamine, L-lysine, ornithine, L-arginine, and D-glucosamine. Non-limiting examples of photocurable polymers include, but is not limited to such as polyimide, poly(ethylene glycol) diacrylate (PEGDA), and poly(ethylene glycol) diacrylamide (PEGDAA); polysaccharides, such as celluloses, alginates, chitosans, hyaluronic acid, glucosaminoglycans, dimethylaminoethyl (DEAE)-cellulose, and DEAE-dextran; hydrophilic poly(amino acids), such as poly-L-glutamic acid, gamma-polyglutamic acid, poly-L-aspartic acid, poly-L-serine, polyornithine, poly-L-arginine, and poly-L-lysine; poly(oxyethylated polyol); poly(olefinic alcohol), such as poly(vinyl alcohol) and aminoacetalized poly(vinyl alcohol); poly(N-vinylpyrrolidone); poly(amidoamine); acrylic or acrylate, and alkacrylic or alkacrylate polymers such as poly(acrylic acid), poly(acrylate), poly(methacrylic acid), poly(methacrylate), poly(hydroxyethyl acrylate); poly(N,N-dimethylaminoethyl methacrylate), poly(N,N-dimethylaminoethyl acrylate), poly(hydroxyalkyl methacrylate) e.g. poly(hydroxyethyl methacrylate); acrylamide polymers such as poly (acrylamide), poly(N,N-dimethylacrylamide), poly(hydroxyalkyl methacrylamide) e.g. poly(hydroxyethyl methacrylamide; poly(ethylene imine); poly(allylamine); poly(vinylamine); and poly(4-vinylpyridine); and copolymers thereof.

It should be noted that the photocurable polymers may be selected to have any appropriate average molecular weight, depending on the desired characteristics of cross-linked polymer matrices in the resultant ionically conductive particles. For instance, a low molecular weight of photocurable polymer may be selected if a stiffer crosslinked polymeric network comprising a smaller mesh size is desired, as opposed to a high molecular weight photocurable polymer if a relatively flexible cross-linked polymer network comprising a larger mesh size is desired.

Any appropriate photo-initiator may be used to photo-initiate the polymerization of a photocurable polymer and/or monomer. In some instances, the photo-initiator may be selected based on hydrophobicity such that an effective amount can be dissolved in the photocurable polymer to initiate the polymerization reaction. Suitable initiators and activators for polymerizing and crosslinking the polymerizable monomer or macromer are known in the art. These include, but are not limited to, free radical initiators, atom transfer radical polymerization (ATRP) initiators, nitroxide mediated polymerization (NMP) initiators, ionic polymerization initiators, amine photochemical co-initiators, and organic photo-initiators. Examples of photo-initiators include, but are not limited to, methyl-1[4-(methylthio) phenyl]-2-morpholinopropan-1-one, phenylbis(2,4,6-trimethylbenzoyl)-phosphine oxide, diphenyl(2,4,6-trimethylbenzoyl)phosphine oxide, 2-hydroxy-4'-(2-hydroxyethoxy)-2-methylpropiophenone, 2,2-dimethoxy-2-phenylacetophenone, 2-hydroxy-2-methylpropiophenone, 1-hydroxycyclohexyl phenyl ketone, etc. Any appropriate amount of photo-initiator may be present in mixture described herein. For instance, photo-initiators may be present in an amount of at least 1 wt %, at least 5 wt %, at least 10 wt %, at least 20 wt %, or at least 30 wt % of a total weight of the mixture. In some embodiments, additives may be present at present in an amount of less than or equal 40 wt %, less than or equal to 30 wt %, less than or equal to 20 wt %, less than or equal to 10 wt %, less than or equal to 5 wt %, or less than or equal to 1 wt % of the mixture. Of course, weight percentages both greater than and less than those noted above for a photo-initiator present in a mixture may also be used as the disclosure is not so limited.

It should be understood that once photocured, the photocurable polymers may have properties of a thermoplastic polymer. For instance, polyethylene glycol diacrylate (PEGDA) of a certain molecular weight (e.g., Mn of 575 g/mol, 700 g/mol, etc.) may be used and photo-polymerized to form a cross-linked network comprising polyethylene glycol (PEG), a thermoplastic polymer. Thus, the disclosed photocured polymer may be any of the thermoplastic polymers discussed herein. Further, for cases in which both a photocurable polymer and a thermoplastic polymer are present in the sprayed mixture, the resultant ionically conductive particles may comprise a continuous phase containing thermoplastic polymer evenly blended into the cross-linked polymeric network formed by the photocured polymer.

Certain aspects of the disclosure are related to methods of using the plurality of ionically conductive particles disclosed herein via spray deposition, e.g., to form solid-state electrolyte and/or solid-state electrode layers in an electrochemical cell. According to certain embodiments, the plurality of ionically conductive particles used herein may be formed according to any one of the previously mentioned methods, e.g., low-temperature milling, spray drying, aerosol polymerization. In some embodiments, a system for forming a particle layer on a substrate includes at least one sprayer configured to electrically charge and spray the disclosed ionically conducting particles towards a substrate to form one or more layers of ionically conducting particles disposed on the substrate. These layers may correspond to one or more selected from the group of an electrode layer (e.g. an anode or cathode), a solid state electrolyte layer, a separator layer, or any other desirable material layer. Depending on the particular application, the substrate may be heated prior to, during, and/or after spray deposition of the ionically conducting powders to improve adhesion of the sprayed particle layers on the substrate. The substrate may be heated using any appropriate method including, but not limited to, radiative heating of the substrate, conductive heating of the substrate, convective heating of the substrate, and/or resistive heating of the substrate where a current is passed through a portion of the substrate corresponding to a location where the ionically conducting particles are sprayed onto the substrate. Material is sprayed to the substrate, and any layers already deposited thereon, being heated, the deposited material may adhere to the heated substrate or layer to form the desired layer (e.g., electrolyte layer and/or electrode layer) disposed thereon.

In some embodiments, it may be desirable to deposit two or more material layers on a substrate. In such an embodiment, a first set of ionically conductive particles, e.g., an electrode powder, may be applied to the substrate to form a first electrode layer, such as an anode or cathode, on the substrate when applied. In an embodiment where the first layer is an electrode layer, the second set of ionically conductive particles may be made from a material to form a solid electrolyte layer disposed on top of the electrode layer. For instance, a second set of ionically conductive particles, e.g., an electrolyte powder, may be applied to the substrate on top of the first electrode layer, to form an electrolyte layer. The systems and methods described herein may be used to form any suitable number of material layers for any desired application as the present disclosure is not so limited. For instance, additional material layers (e.g., additional electrode layers, separator layers, solid-electrolyte layers, etc.) may be deposited accordingly, depending on application needs.

The use of ionically conductive powder for spray deposition may allow easy access to a large window of compositional parameters previously inaccessible by slurry casting methods. For instance, the ionically conductive powder may be capable of retaining high concentrations of inorganic solids (e.g., at least 60 wt %), and/or a high concentrations of ionically conducting salts (e.g., at least 50 wt %). Additionally, a wide variety of components (e.g., salt, electroactive material, ceramic powder, plasticizer, thermoplastic polymer, other additives, etc.) may be incorporated into the ionically conductive particles at the same time. For instance, as mentioned, these components may be combined into a mixture in a one-step process during fabrication of the powders, thereby reducing the complexity of production.

By simply adjusting the components within the combined mixture, different types of ionically conductive powders may be formed. For instance, the methods described herein may allow for an easy switch between production of different types of powders (e.g., electrolyte powders, electrode powders). Advantageously, these powders may be used in conjunction to build a solid-state battery comprising any desired number and type structures (e.g., electrode layers, electrolyte layers).

The use of ionically conductive powders described herein for electrochemical cell manufacturing may lead to electrochemical cells with improved conductive properties and longer battery life. For instance, uniform solvation of ionically conductive salt and/or uniform dispersion of electroactive material and/or ceramic powders in the plurality of ionically conductive powders may lead to the formation of electrode/electrolyte layer with improved conductive properties. Additionally, the low moisture and residual solvent content associated with the powders may reduce degradation of the electrochemical cells, thus leading to a longer operational life.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a schematic representation of an ionically conductive particle, according to certain embodiments. A non-limiting representation of a cross-sectional view of ionically conductive particle 10 is depicted. The particle includes a continuous phase 15 comprising an ionically conductive salt dissolved in a thermoplastic polymer, and optionally a plurality of inorganic solid particles (e.g., ceramic and/or glass particles) 20 and/or electroactive material particles 25 dispersed in the continuous phase. As shown, the plurality of inorganic solid particles 20 and/or electroactive material particles 25 may be uniformly dispersed in the thermoplastic polymer. However, instances in which two or more particles form an agglomeration within the continuous thermoplastic phase are also contemplated. In some cases, at least one or more of the plurality of dispersed inorganic solid particles and/or electroactive material particles may be at least partially embedded in the ionically conductive polymer. For instance, as shown in FIG. 1, while a majority of the electroactive material particles 25 are completely embedded in an inner volume of ionically conductive particle 10, electroactive material particle 25A is only partially embedded, e.g., as shown by a partial protrusion of particle 25A out of thermoplastic polymer 15.

It should be noted that other combinations of components and arrangements may be possible within the ionically conductive particle. For instance, in one specific set of embodiments, the ionically conductive particle comprises ionically conductive salt, inorganic solid particles, thermoplastic polymer, and an optional additive such as a plasticizer. In another specific set of embodiments, the ionically conductive particle comprises electroactive material particles, inorganic solid particles (e.g., ceramic and/or glass particles), thermoplastic polymer, a plasticizer, and optionally an ionically conductive salt. Additionally, embodiments in which the ionically conductive particle is substantially free of particulates are also contemplated. In some instances, other components such as a photocurable polymer may be incorporated into the ionically conductive particle, as disclosed elsewhere herein.

Figure 2:
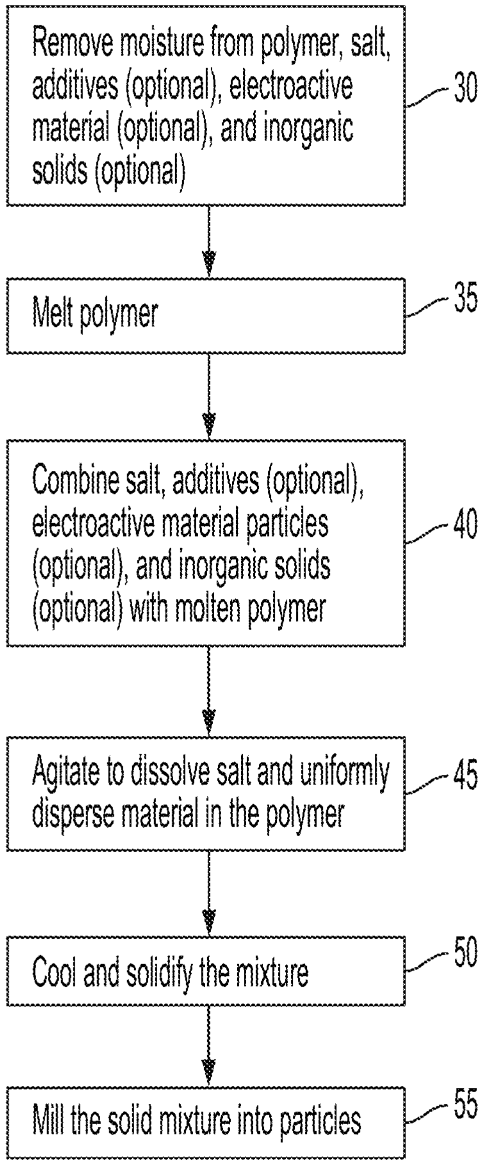
FIG. 2 shows a schematic diagram of a method for making ionically conductive particle involving direct dissolution in molten polymer and low-temperature milling, according to certain embodiments.

FIG. 2 shows a schematic diagram of a method for making ionically conductive particle involving direct dissolution of ionically conductive salt in a molten polymer followed by low-temperature milling, according to certain embodiments. According to certain embodiments, moisture is removed from individual components of the mixture prior to mixing. This may include drying of a thermoplastic polymer, ionically conductive salt, and any of the optional components (e.g., additives, electroactive material, inorganic solids (e.g., ceramic and/or glass powder), etc.) prior to forming a mixture (e.g., 30 in FIG. 2) using heating, vacuum treatment, exposure to low moisture content atmospheres, combinations of the forgoing, and/or any other appropriate drying method. In some cases, moisture is removed such that the moisture content of all the components is less than or equal to 2 wt %, less than or equal to 1 wt %, less than or equal to 0.5 wt %, less than or equal to 0.2 wt %, less than or equal to 0.1 wt %, or any other appropriate weight percent prior to forming the mixture. As shown in FIG. 2, the thermoplastic polymer can then be melted and combined with an ionically conductive salt to form a mixture (e.g., 35 and 40 in FIG. 2). Optionally, other components such as electroactive material particles, inorganic solid particles, and additives (e.g., a plasticizer) may be incorporated into the mixture. In accordance with certain embodiments, the mixture is then agitated to dissolve the ionically conductive salt, and optionally to uniformly disperse any additional components (e.g., electroactive material particles, inorganic solid particles, additives, etc.) in the molten thermoplastic polymer (e.g., 45 in FIG. 2). It should be noted that the thermoplastic polymer may be agitated at a temperature relatively close to its melting temperature and without significant aeration, as too high of a temperature (e.g., close to a decomposition temperature) or high aeration may lead to undesired degradation of the thermoplastic polymer. It should be noted that the additives may either be dissolved or dispersed in the thermoplastic polymer, depending on the type of additives. Any appropriate methods of agitation and duration of agitation may be used as discussed below.

After mixing, the mixture resulting from 45 can be cooled and solidified at a temperature either above or below the glass transition point of the thermoplastic polymer (e.g., 50 in FIG. 2), as previously discussed. The solidified mixture resulting from 50 can be milled into particles, e.g., ionically conductive particles described herein. Any types of milling apparatus (e.g., ball mill, knife mill, etc.) may be used as previously discussed. The particles may be milled until a target particle size has been reached (e.g., 55 in FIG. 2). The final particle size may be controlled by several operating parameters, including, but not limited to, milling duration and frequency. In some cases, the milled particles may be optionally passed through one or more sieves comprising meshes of certain dimensions, e.g., to remove larger particles and/or to reduce size polydispersity of the milled particles.

As noted above, in certain embodiments, the ionically conductive salt may be dissolved in a molten thermoplastic polymer at a temperature greater than or equal to the melting temperature of the thermoplastic polymer. For instance, the ionically conductive salt may be dissolved in the molten thermoplastic polymer at a temperature of less than or equal to 350° C., less than or equal to 300° C., less than or equal to 250° C., less than or equal to 175° C., less than or equal to 150° C., less than or equal to 125° C., less than or equal to 100° C., less than or equal to 80° C., less than or equal to 60° C., less than or equal to 40° C., less than or equal to 20° C. In some embodiments, the ionically conductive salt may be dissolved in the molten thermoplastic polymer at a temperature of at least 20° C., at least 40° C., at least 60° C., at least 80° C., at least 100° C., at least 140° C., at least 180° C., at least 220° C., at least 260° C. Combination of the above-referenced ranges are also possible (e.g., at least 60° C. and less than or equal to 175° C.). Other values are also possible depending on the particular salt and polymer being used. For instance, an ionically conductive salt may be dissolved at room temperature in some thermoplastic polymers (e.g., copolymer blends, etc.)

It should be understood that any appropriate method for agitating a mixture to uniformly dissolve the ionically conductive salt in the molten polymer and/or to uniformly disperse particles within the mixture may be used. Accordingly, the mixture may be heated to a temperature such that the thermoplastic polymer can have a desirable viscosity, e.g., that allows for efficient mixing and dispersion of the plurality of inorganic solid particles and/or electroactive material particles in the thermoplastic polymer. In certain embodiments, depending on the viscosity of the thermoplastic polymer, the mixture may be agitated for an appropriate amount of time (e.g., at least 0.25 days, at least 0.5 days, at least 1 day, at least 2 days, etc.), until uniform dispersion have been achieved. Any appropriate methods of agitation may be utilized, e.g., mechanical agitation (e.g., mixers), ultrasonic waves (e.g., sonicator), etc.

As mentioned above, after agitating a mixture, the resulting mixture may be solidified by cooling the mixture to a temperature above or below the glass transition temperature of the thermoplastic polymer depending on the particular materials been used. In some embodiments, the powder may be milled at temperature of less than or equal to 100° C., less than or equal to 80° C., less than or equal to 60° C., less than or equal to 40° C., less than or equal to 20° C., less than or equal to 0° C., less than or equal to −20° C., less than or equal to −40° C., or less than or equal to −60° C. Other temperatures may be possible, as long as the solidified mixture can be effectively milled.

Figure 3:
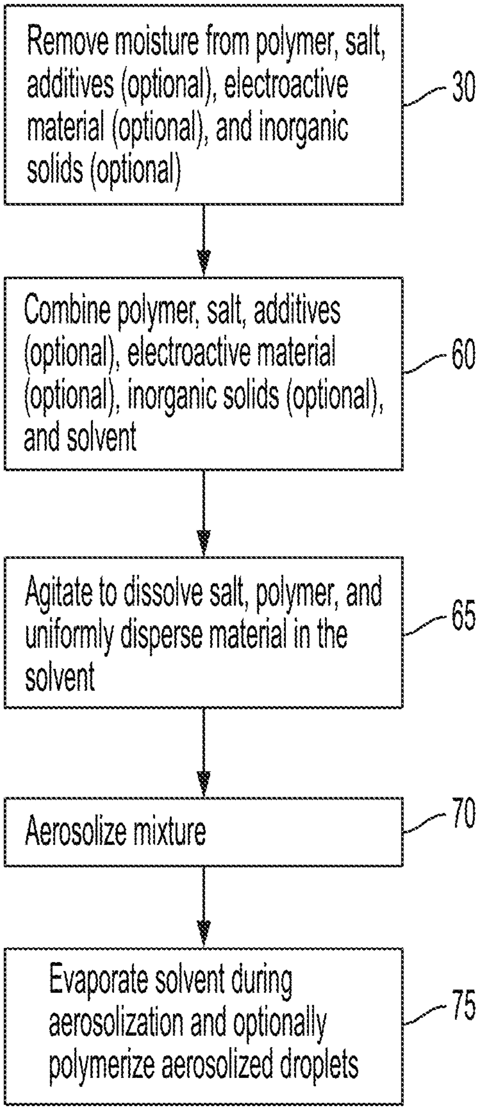
FIG. 3 shows a schematic diagram of a method for making ionically conductive particle involving spray drying and/or aerosol polymerization, according to certain embodiments.

FIG. 3 shows a schematic diagram of a method for making ionically conductive particle involving spray drying and/or aerosol polymerization, according to certain embodiments. First, moisture may be removed from individual components of the mixture, including, the thermoplastic polymer, ionically conductive salt, and any optional components (e.g., additives, electroactive material particles, inorganic solid particles, etc.) prior to forming a mixture (e.g., 30 in FIG. 3). It should be noted that this moisture removal step may be the same as in the embodiment described with respect to FIG. 2. For instance, moisture may be removed such that the moisture content of all the components is equal less than or equal or less to 0.5 wt % prior to forming the mixture.

As shown at 60 in FIG. 3, a thermoplastic polymer may be combined with an ionically conductive salt and a solvent to form a mixture. Optionally, other components such as electroactive material particles, inorganic solid particles, and additives (e.g., a plasticizer) may be incorporated in the mixture. In accordance with certain embodiments, the mixture may be agitated to dissolve both the salt and polymer in the solvent via a co-dissolution process, and to disperse any optional materials (e.g., electroactive material, ceramic powder, etc.) in the solvent (e.g., 65 of FIG. 3). Any aforementioned ionically conductive salt, thermoplastic polymer, and solvent may be used. Any means of agitation may be used, as long as appropriate solvation of salt and polymer and dispersion of components (e.g., electroactive material, ceramic powder) in the mixture can be achieved. For instance, the mixture may be agitated such that a plurality of inorganic solid particles and/or electroactive material particles become uniformly dispersed in the thermoplastic polymer using a mechanical mixer, an ultrasonic device, and/or any other appropriate mixing method.

As shown in 70 of FIG. 3, the mixture may next be sprayed, i.e., aerosolized, to form a plurality of droplets with a desired range of sizes. In some cases, the solvent from the aerosolized mixture (droplets) may be evaporated to form a plurality of ionically conductive particles (e.g., 75 in FIG. 3). In some such instances, the resultant plurality of ionically conductive particles is substantially free from a solvent. For example, in accordance with a specific embodiment, the plurality of ionically conductive particles comprises a solvent and/or moisture content of less than or equal to 0.5 wt % or any other solvent/moisture content disclosed elsewhere herein. In some case, as described elsewhere herein, for cases where a photocurable polymer is present in the mixture (e.g., 30 in FIG. 3), the droplets may undergo a polymerization reaction where a photocurable polymer and initiator present in the droplets is exposed to electromagnetic radiation to photocure the ionically conductive particles during the spray or aerosol polymerization process (e.g., 75 in FIG. 3). Such a process is described further relative to FIGS. 5-6.

Figure 4A:
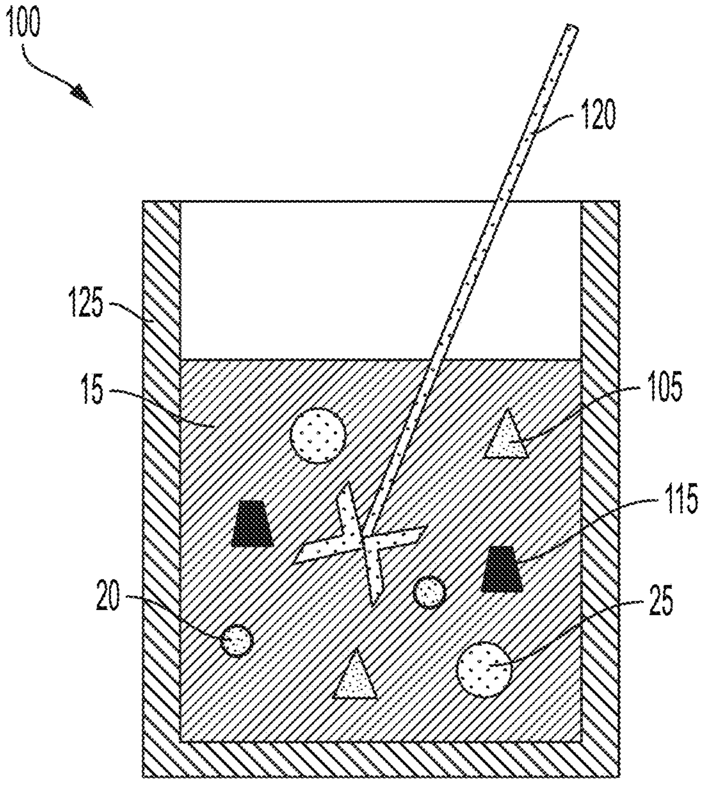
FIG. 4A-4B show schematic representations of the schematic diagram of a method for making ionically conductive particles as shown in in FIG. 2, in accordance with certain embodiments.
Figure 4B:
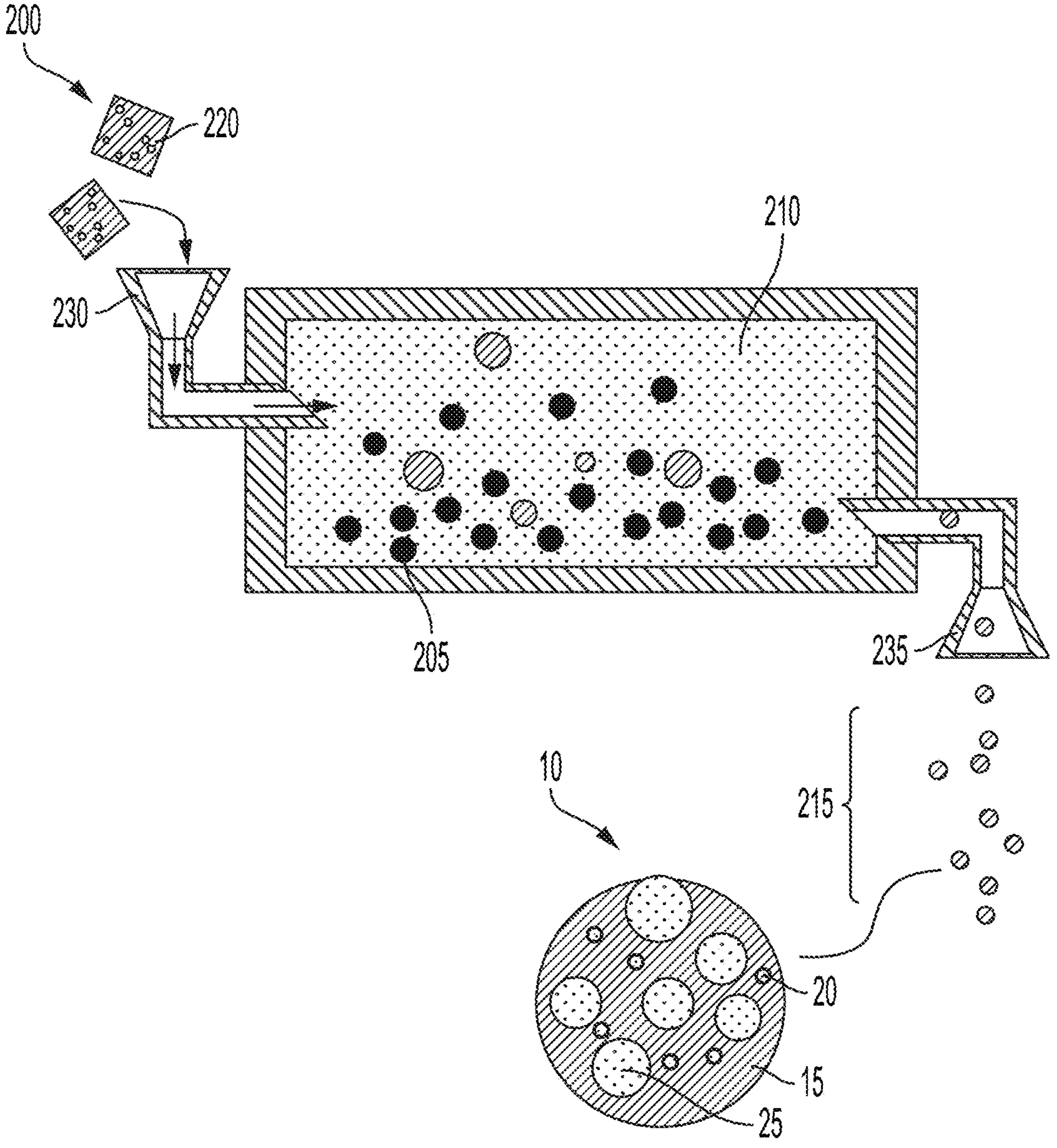

FIG. 4A-4B show schematic representations of a method for making ionically conductive particles as described in FIGS. 2 (40 and 45), in accordance with certain embodiments. FIG. 4A shows a schematic representation associated with direct dissolution 100 of materials in a molten polymer. As shown, a mixture disposed in a container 125 may comprise ionically conductive salt 115 combined with thermoplastic polymer 15 in a molten state. One or more optional components comprising additives 105, electroactive material particles 25, and inorganic solid particles 20, may be present in the mixture. To dissolve the ionically conductive salt and uniformly disperse the optional components, the mixture can be agitated using mixing blade 120 for an appropriate amount of time at an elevated temperature though other methods for mixing the mixture as previously described may also be used.

After cooling and solidifying the mixture (e.g., 50 from FIG. 2), the solidified mixture may be milled. FIG. 4B shows a schematic representation associated with a low-temperature milling system 200 using a ball mill. As shown, the ball mill comprises inlet 230, a rotating cylinder 210 that is partially filled with balls 205, and an outlet 235. During operation, a feedstock of solidified mixture 220 can be fed into rotating cylinder 210 via inlet 230. As rotating cylinder 210 rotates about a center axis, the solidified mixture 220 may be ground into particles of a certain average size as balls 205 tumble and collide with solidified mixture 220. The ground particles may exit from outlet 235. In some cases, the resultant particle size and polydispersity may be affected by operation time of the ball mill, the power input, in addition to parameters such as the size and material of the balls. The solidified mixture may be ultimately ground into ionically conductive powder 215 comprising a plurality of ionically conductive particles. As shown, the resultant ionically conductive particles may comprise a structure and contain materials as described relative to the various embodiments disclosed herein.

Figure 5:
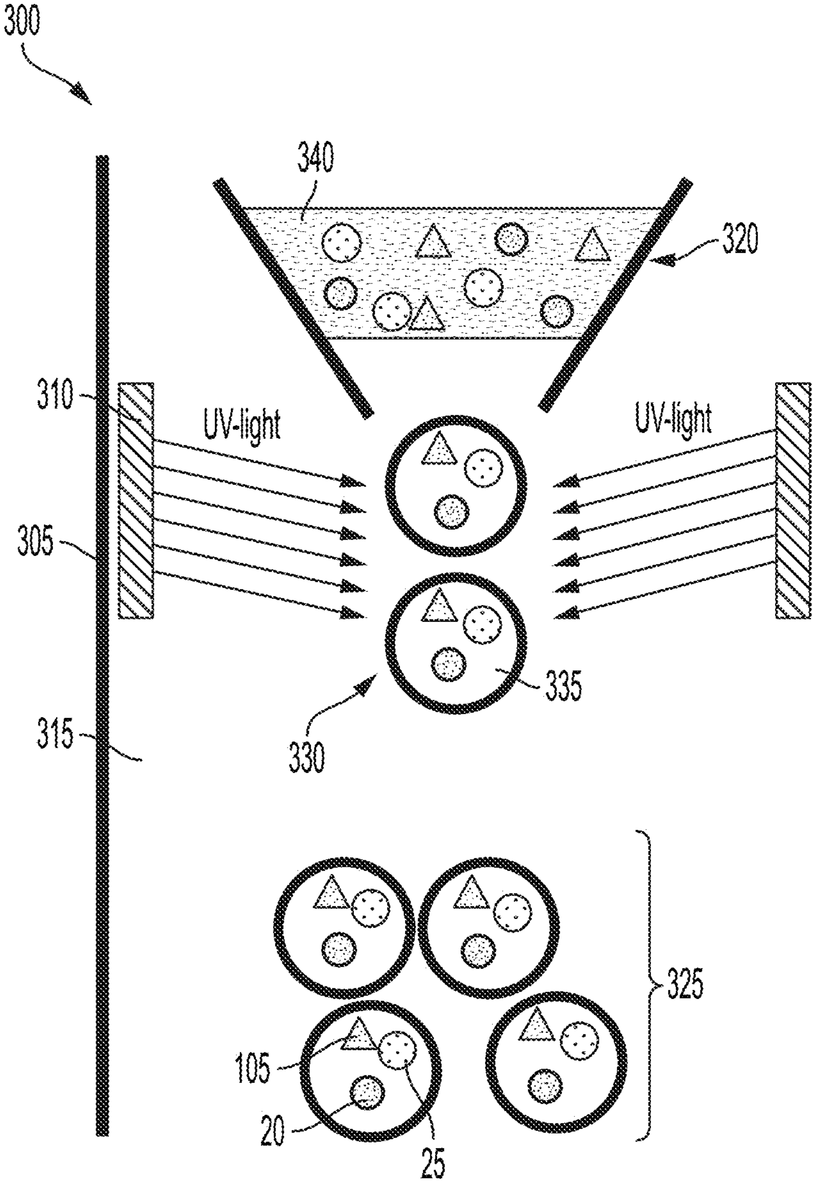
FIG. 5 is a side schematic representation of an aerosol photopolymerization system, according to certain embodiments.

FIG. 5 is a side schematic representation of an aerosol photopolymerization system, according to certain embodiments. As shown, aerosol photopolymerization system 300 may be used to aerosolize a mixture into aerosolized droplets, and photo-polymerize the aerosolized droplets to form a plurality of ionically conductive particles (e.g., as shown in 75 of FIG. 3). In some cases, aerosol photopolymerization system 300 comprises atomizing nozzle 320 filled with mixture 340, a light source 310 (e.g., UV-lamp), and a gas filled chamber 315 housed within container 305. As shown in FIG. 5, mixture 340 may comprise an ionically conductive salt, a photo-initiator, a photocurable polymer, and optionally a solvent. Depending on whether or not ionically conducting particles with or without separate particles disposed therein are to be formed, one or more optional components (e.g., an additive 105, inorganic solid particles 20, and electroactive material particles 25) may also be present within the mixture.

As shown in FIG. 5, the mixture 340 may be sprayed from atomizing nozzle 320 into an internal gas filled chamber 315, where the sprayed mixture is aerosolized into droplets by atomizing nozzle 320. Depending on the materials being used, the gas filled chamber may include any appropriate atmosphere including, but not limited to, gases that are relatively non-reactive with the materials of the ionically conducting particles such as argon, nitrogen, and/or any other appropriate gas. It should be noted that the gases may be sufficiently dry, i.e., free of moisture to avoid significant reaction with any electroactive materials present and to further promote evaporation of solvents (including water) from the droplets. Additionally, in some instances, it may be desirable to control a temperature of the gas contained within the container to be at a desired operating temperature to facilitate evaporation of the solvent from the droplets. Additionally, the aerosolized droplets may also be exposed to an electromagnetic radiation from the light source 310 while in-flight. Upon exposure to the light, the photocurable polymer within the aerosolized droplets may photopolymerize to form a powder 325 comprising a plurality of cured ionically conductive particles 330, though instances in which a light source and photocurable polymers are not used are also contemplated as previously discussed. That said, in instances where a photocurable polymer is used, the cured ionically conductive particles 330 may comprise a plurality of dispersed components (e.g., electroactive material particles 25, inorganic solid particles 20, etc.) dispersed uniformly in cross-linked polymeric network 335, and may have a structure and composition as described elsewhere herein.

It should be noted that in some instances, the resultant powder (e.g., 325 in FIG. 5) may be collected by any method including, but not limited to, gravitational settling, inertial impaction, cyclone separation, filtering, etc.

It should be noted that a resultant average particle size of powder 325 may be controlled by adjusting several operating parameters, including, but not limited to, the viscosity of mixture 340, the feed rate of mixture 340, the atomizing pressure of nozzle 320, temperature of the gas filled chamber 315, and/or any other appropriate operating parameter. The resultant plurality of ionically conductive particles may have any average particle size and size polydispersity as disclosed elsewhere herein.

Figure 6:
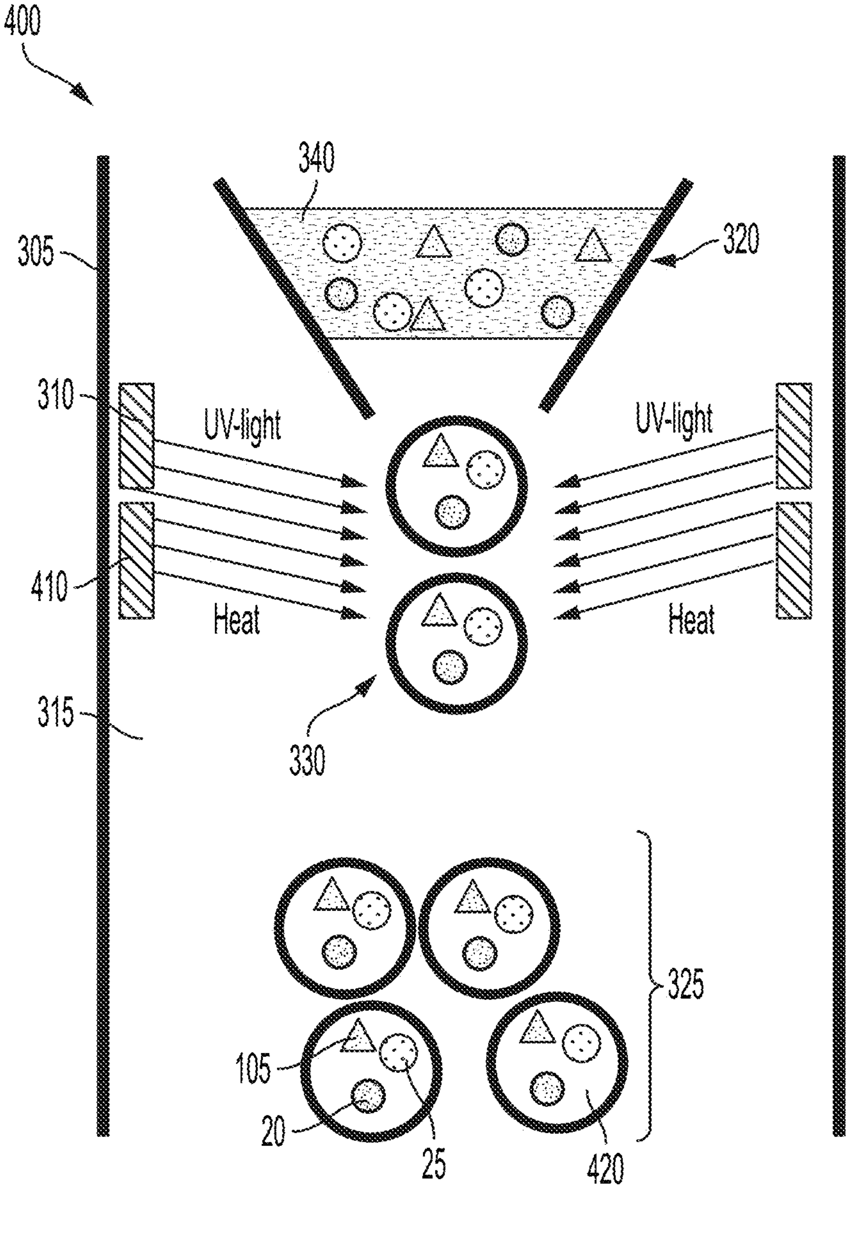
FIG. 6 is a side schematic representation of a spray drying and photopolymerization system, according to certain embodiments.

FIG. 6 is a side schematic representation of a spray drying and aerosol photopolymerization system, according to certain embodiments. FIG. 6 comprises a dual spray drying and aerosol photopolymerization system 400 that comprises an enhanced drying capability in addition to the spray polymerization system previously disclosed (e.g., 300 in FIG. 5). For instance, spray drying and polymerization system 400 comprises the same system components as the spray polymerization system described relative to FIG. 5 including an atomizing nozzle 320 filled with mixture a 340, a light source 310 (e.g., UV-lamp), and a gas filled chamber 315 housed within container 305. Similar to the above, mixture 340 comprises ionically conductive salt, photo-initiator, photocurable polymer, an optional solvent, and optional components (e.g., additive 105, inorganic solid particles 20, electroactive material particles 25). Additionally, in accordance with certain embodiments, the mixture 340 may include a thermoplastic polymer dissolved in a solvent.

As shown in FIG. 6, in accordance with certain embodiments, as mixture 340 is sprayed from atomizing nozzle 320 into internal gas filled chamber 315, the sprayed mixture is aerosolized into droplets by atomizing nozzle 320. Accordingly, the aerosolized droplets may be exposed to both heat from a heater 410, which may be a convective and/or radiative heater oriented towards a path of travel of the particles through the container, and electromagnetic radiation from the light source 310 while in-flight. In such an embodiment, solvent evaporation during photocuring may be enhanced, thus forming a powder 325 comprising a plurality of cured ionically conductive particles 330 substantially free from the solvent. Similar to the above embodiments, cured ionically conductive particles 330 may comprise a plurality of dispersed components (e.g., electroactive material particle 25, inorganic solid particles 20) dispersed uniformly in cross-linked polymeric network 420, and have a structure and properties disclosed elsewhere herein and/or similar to ionically conductive particle 10 in FIG. 1.

While embodiments of photocuring spray systems have been described above, it should be understood that similar spray systems for forming the materials described herein without light sources where a solvent is evaporated from the droplets without a photocurable polymer may also be used.

Figure 7:
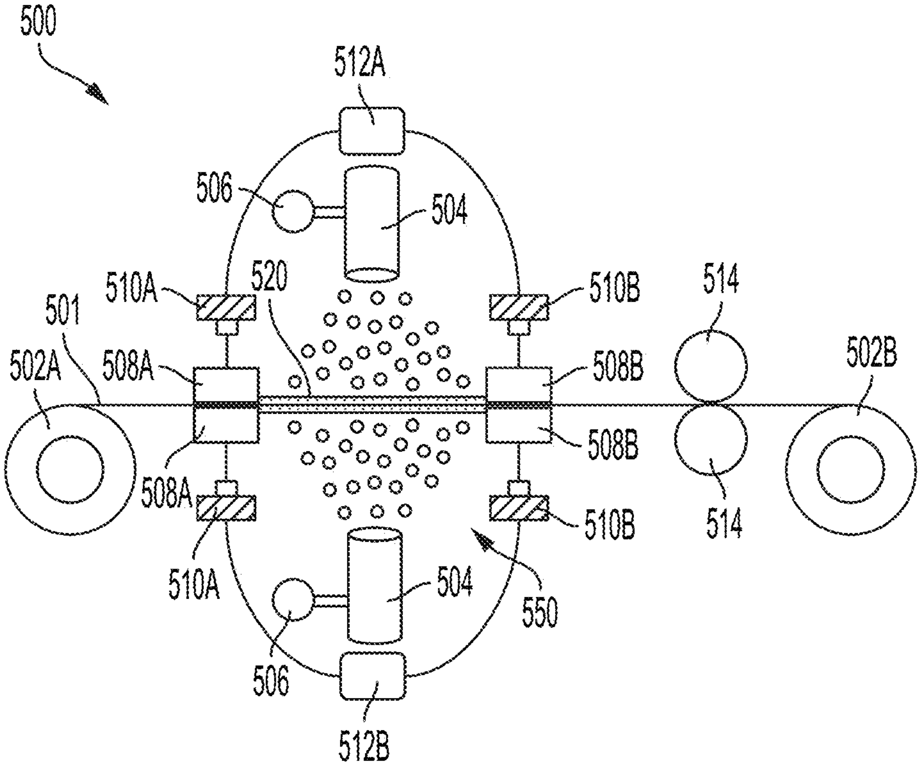
FIG. 7 is a side schematic representation of a spray deposition system during a material deposition process, according to certain embodiments.

FIG. 7 is a side schematic representation of one embodiment of a spray deposition system 500 for forming a layer on a substrate. In particular, the spray deposition system of FIG. 7 may be configured to form a battery electrode including an anode or cathode material, and/or a solid-state electrolyte. As shown in FIG. 7, the spray deposition system includes a reel to reel manufacturing system for moving a substrate 501, such as a metal foil, through the system though static manufacturing arrangement are also contemplated. For example, in the depicted embodiment, a system may include a first roller 502A and a second roller 502B between which the substrate is suspended. The first and second rollers are configured to move the substrate from one roller to the other roller (e.g., from the first roller to the second roller or from the second roller to the first roller). In either case, the substrate is unwound from one roller and wound onto the other roller so that material may be deposited in a continuous or semi-continuous process if desired. The spray deposition system also includes at least one sprayer 504 directed towards the substrate for depositing a material thereon. For instance, in accordance with certain embodiments, a plurality of ionically conductive particles 10 may be sprayed by sprayer 504 onto a deposition location on the substrate. The ionically conductive particles 10 may be the same particles described relative to FIG. 1 and may have any suitable properties of the ionically conductive particle as described elsewhere herein.

In embodiments where it is desirable to deposit material on both sides of a substrate simultaneously, two sprayers 504 may be disposed on opposite sides of the substrate for depositing material onto two surfaces of the substrate in a single process. In either case, the sprayers may be arranged as a spray gun or any other appropriate device capable of aerosolizing, and in some embodiments appropriately charging, a powder that is then sprayed onto a surface of the substrate for a powder coating process. In the above embodiment, the sprayers are each connected to a reservoir 506 which contains a powdered material (e.g., a plurality of ionically conductive particles 550) for deposition on the substrate. In some embodiments, the reservoir may correspond to a fluidized bed, a venturi atomizer, a Wright dust feeder, or other appropriate device that is capable of aerosolizing and/or otherwise transporting the dry powder to the sprayer. As will be discussed further with reference to FIG. 7, the sprayer may charge the particles ejected from the spray gun which may facilitate the particles evenly distributing across and adhering to a region of the substrate targeted by the sprayer.

As discussed previously, the powdered material may include any appropriate material components for use in forming one or more layers within an electrochemical cell including, but not limited to anode, cathode, separator, and/or solid electrolyte layers. These materials may include an ionically conductive salt, a thermoplastic polymer, an ionically conductive inorganic material (e.g., ionically conductive ceramic and/or glass powder), an additive, an electroactive material, a non-ionically conductive inorganic material (e.g., non-ionically conductive ceramic or glass powder), an electrically conductive material, combinations of the foregoing, and/or any other appropriate material.

As shown in the embodiment of FIG. 7, the spray deposition system may also include one or more masks to define a deposition region the sprayers are directed towards. For example, first masks 508A and second masks 508B which are coupled to first mask actuators 510A and second mask actuators 510B, respectively, may be used. According to the embodiment of FIG. 7, the first masks and second masks are configured as clamps which close on upper and lower surfaces of the substrate 501 to selectively grasp and cover regions of the substrate to keep them bare during a spray deposition process. The first and second mask actuators are controlled by a first mask actuator controller 512A and a second mask actuator controller 512B, which may control a supply of electricity, air, and/or hydraulic fluid employed by the mask actuators to move the masks into or out of contact with the substrate. Of course, in other embodiments, a spray deposition system may employ a single mask actuator controller or any other suitable number of mask actuator controllers which control any suitable number of mask actuators, as the present disclosure is not so limited. Further, these controllers may include at least one hardware processor and at least one associated non-transitory computer-readable storage medium storing processor executable instructions that, when executed by the at least one hardware processor control the actuators and other components of the system to perform the methods described herein.

In accordance with certain embodiments, the charged spray of particles may be applied to a heated substrate to form a film of the ionically conductive particles on the substrate. In some instances, the first and second masks 508A, 508B are configured to pass a current supplied by an associated power source between the first and second masks through the substrate 501 to resistively heat the substrate between the masks in a region the one or more sprayers 504 are directed towards. That is, the passage of current though the substrate in combination with the internal electrical resistance of the substrate generates internal heat in the substrate in the region of the substrate between the first and second masks. For example, the first and second masks may be configured to function as electrodes which make electrical contact with the substrate when the masks are in a contact with the substrate to mask a bare region of the substrate from sprayed particles. The spray deposition system 500 may also include a pair of calendering rollers 514 which may be used to densify a deposited material layer. The calendering rollers may be heated and apply a sufficiently high pressure to the substrate and any material layers which may be disposed on the substrate to densify the layer to a desired thickness and bond the layer to the substrate as the substrate passes between the pair of calendering rollers. Accordingly, after a deposited material layer is passed through the calendering rollers, the material layer may have a uniform density and thickness, in addition to being denser than the non-calendered layer.

While a particular spray deposition system has been described relative to FIG. 7, it should be understood that any appropriate spray deposition capable of depositing the materials described herein may be used as the disclosure is not limited in this fashion.

Example 1

This example illustrates experiments conducted to produce an ionically conductive powder comprising a plurality of ionically conductive particles, in accordance with certain embodiments.

In particular, a method comprising spray drying (e.g., as shown in FIG. 3) was used to produce the plurality of ionically conductive particles. First, moisture was removed from individual components including PVDF-HFP polymer, lithium manganese cobalt oxide (NMC) electroactive particles (about 20 um in average particle size), and LiTFSI salt. PVDF-HFP (Sigma-Aldrich 99.9% pure) was mixed with LiTFSI (Sigma-Aldrich 99.9% pure) in a 60:40 weight ratio, respectively. The resulting powder mixture was solvated in acetone at 0.03 g/mL of acetone. To solvate or disperse the individual components in acetone, the mixture was stirred at 300-600 rpm at room temperature until the LiTFSI and PVDF-HFP were fully dissolved in acetone, and until the NMC particles were uniformly dispersed in acetone. Approximately 50 mL of the mixture was loaded into a spray dryer solution column and aerosolized. The resulting mixture was sprayed in a chamber at 30-60° C. Feed pressure was approximately 75 psi. Acetone was evaporated during aerosolization to produce the plurality of ionically conductive particles. The input pressure and feed rate of the mixture, the mixture composition (e.g., amount of PVDF-HFP and/or LiTFSI), and the gas pressure inside the sprayer chamber, were adjusted to optimize the resultant ionically conductive particle size. Particles comprising LiTFSI salt dissolved in PVDF-HFP, but without NMC, were also produced.

Figure 8A:
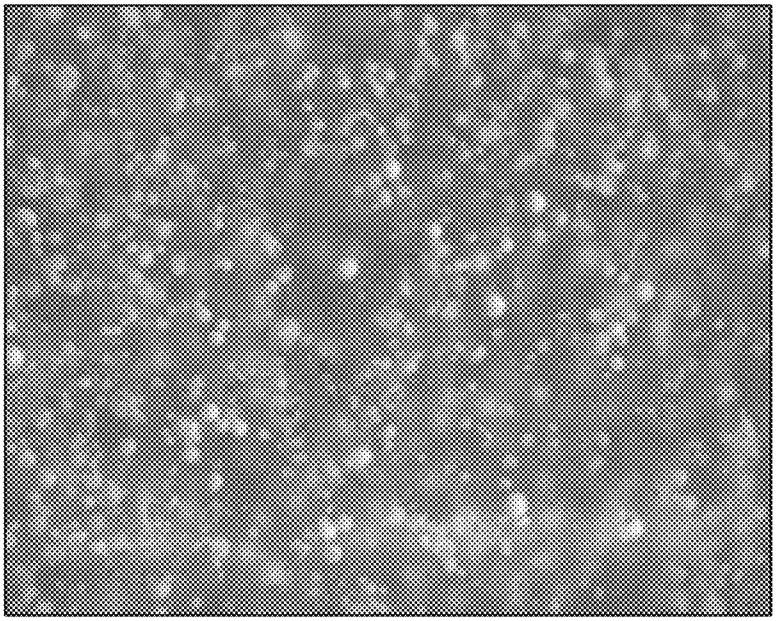
FIG. 8A shows a SEM image of a plurality of ionically conductive particles comprising PVDF-HFP, LiTFSI, and lithium nickel manganese cobalt oxide (NMC) particles produced via spray drying, according to certain embodiments.
Figure 8B:
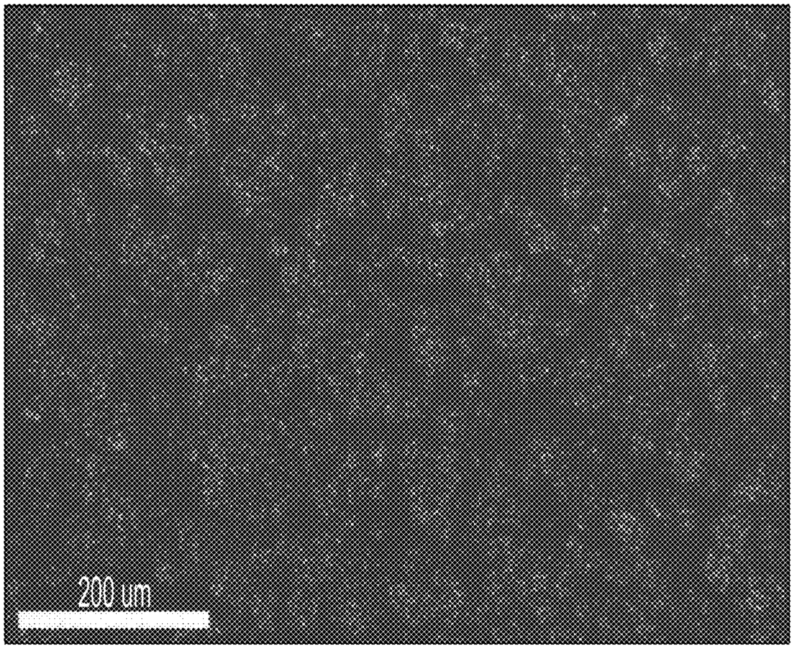
FIG. 8B shows a SEM-EDS image of the plurality of ionically conductive particles in FIG. 8A illustrating uniform sulfur distribution from LiTFSI in the plurality of ionically conductive particles, according to certain embodiments.
Figure 9A:
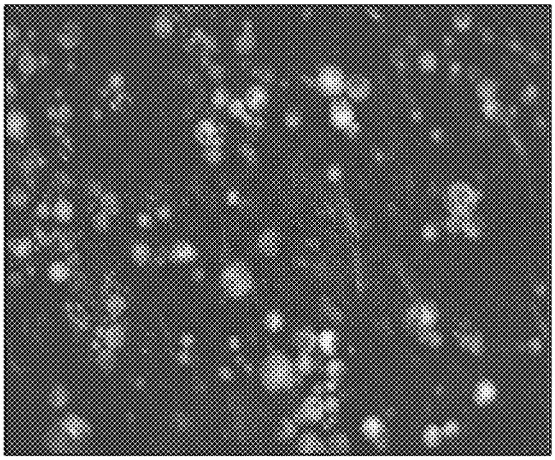
FIG. 9A-9F show optical images of the plurality of ionically conductive particles, according to certain embodiments.
Figure 9B:
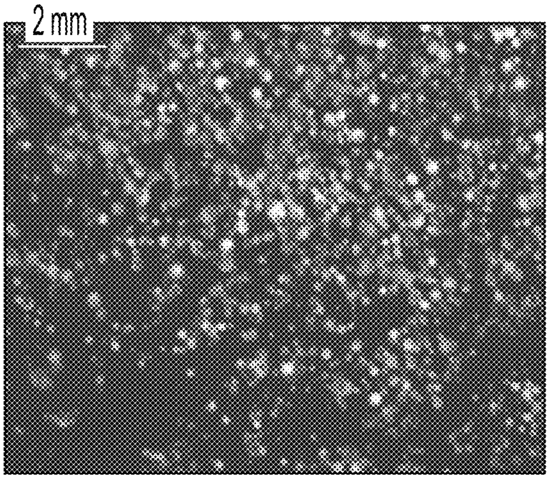
Figure 9C:
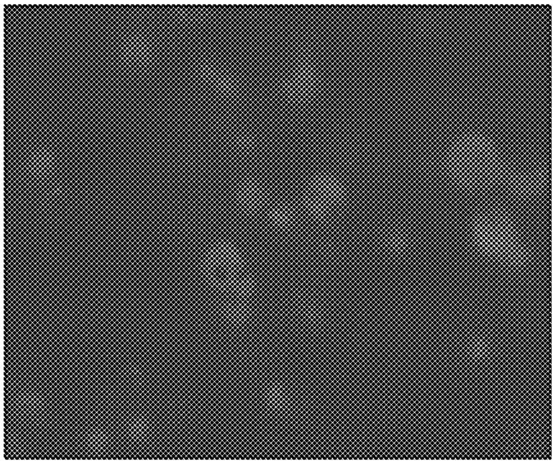
Figure 9D:
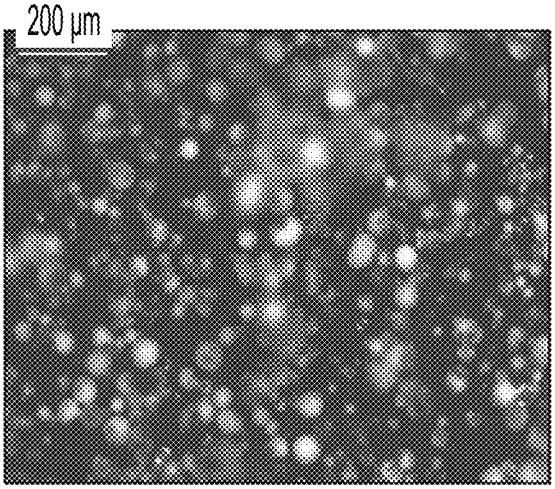
Figure 9E:
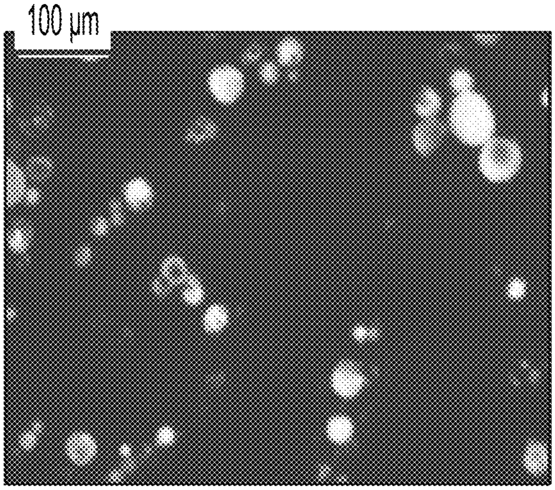
Figure 9F:
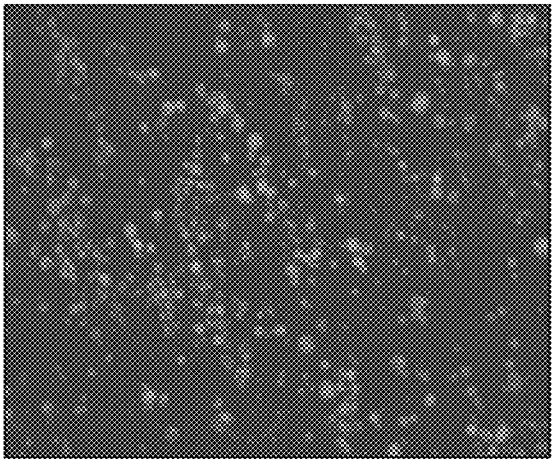
Figure 10A:
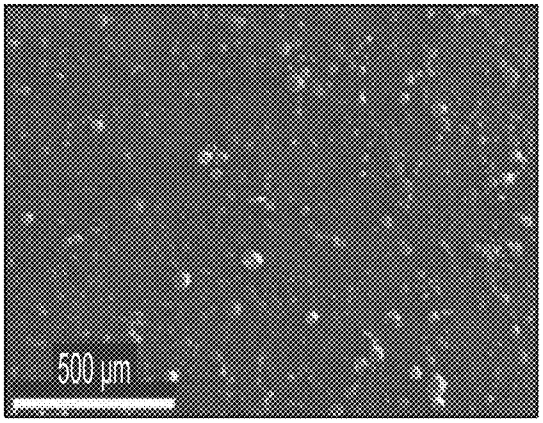
FIGS. 10A-10E show additional SEM-EDS images of the plurality of ionically conductive particles, according to certain embodiments.
Figure 10B:
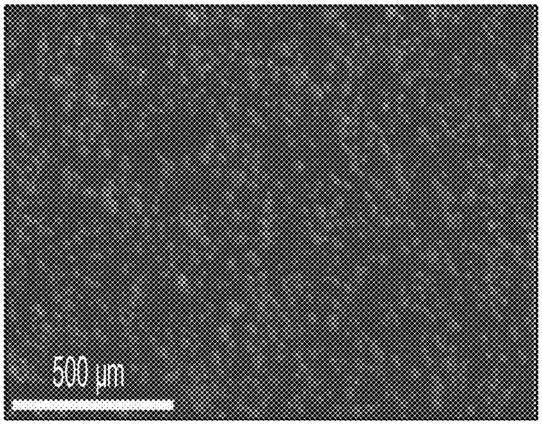
Figure 10C:
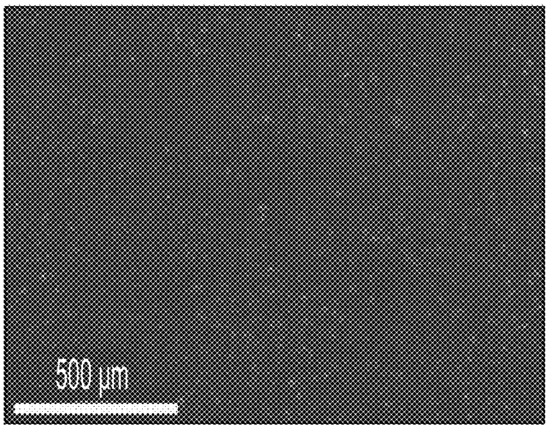
Figure 10D:
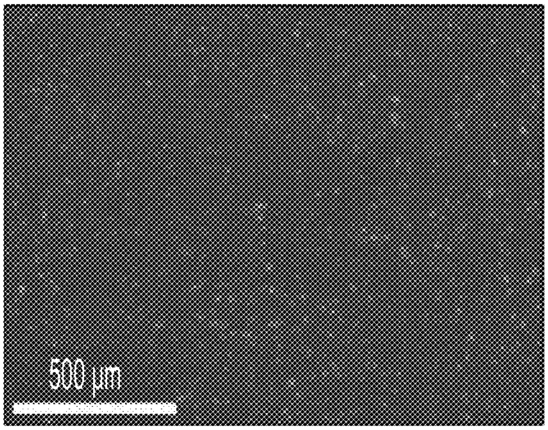
Figure 10E:
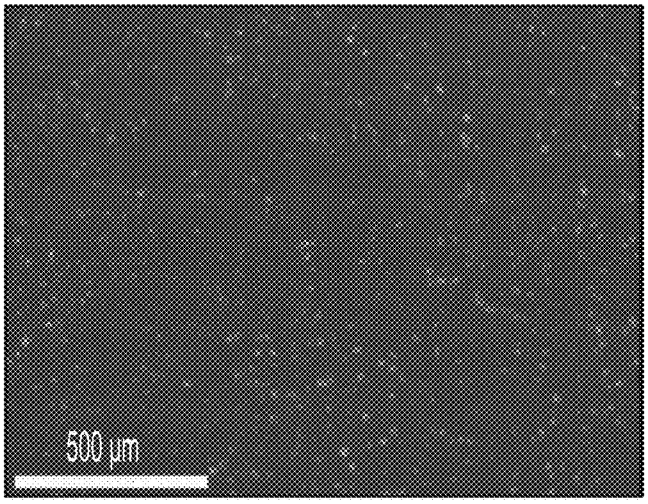

The resultant ionically conductive particles comprised a continuous phase comprising PVDF-HFP, solvated and uniformly distributed LiTFSI, and uniformly dispersed NMC. FIG. 8A shows an image of a plurality of ionically conductive particles comprising PVDF-HFP, LiTFSI, and Lithium nickel manganese cobalt oxide (NMC) particles produced via spray drying. Additional optical images of the plurality of ionically conductive particles are shown in FIGS. 9A-9F. FIG. 8B shows a SEM-EDS image of the plurality of ionically conductive particles in FIG. 8A, illustrating the uniform sulfur distribution from LiTFSI in the plurality of spray-dried ionically conductive particles. EDS images of the other elements (e.g., F, Co, Mn, Ni) are shown in FIGS. 10A-10E. For instance, FIG. 10A shows a SEM image of the plurality of ionically conductive particles and FIGS. 10B-10E show the corresponding SEM-EDS images of fluorine content (FIG. 10B), cobalt content (FIG. 10C), manganese content (FIG. 10D), and nickel content (FIG. 10E) in the plurality of ionically conductive particles. As shown, the plurality of NMC electroactive particles consisting of Ni, Mn, and Co (FIGS. 10C-10E) were at least partially or completely encapsulated by the polymer, which was characterized by its fluorine content (FIG. 10B).

Figure 11:
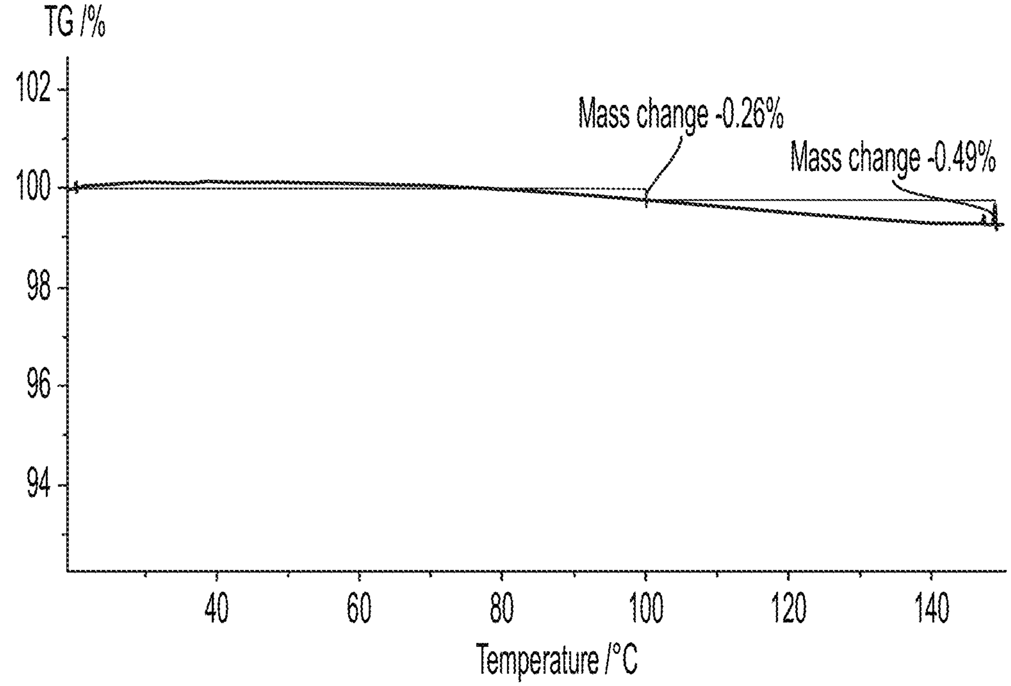
FIG. 11 shows a graph of thermogravimetric analysis (TGA) measurements illustrating negligible amounts of residual acetone and moisture in a plurality of ionically conductive particles after spray drying, according to certain embodiments.

The resultant sprayed dried ionically conductive particles were subjected to a thermogravimetric analysis (TGA) test to determine the amount of residual acetone and moisture in the particles. As shown in FIG. 11, TGA results confirmed that negligible amounts of residual acetone and moisture on the order of less than 0.5 wt % were present in the plurality of ionically conductive particles was measured after spray drying.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method, comprising:

combining a curable polymer and/or monomer, an initiator, and an ionically conductive salt to form a mixture;

dissolving the ionically conductive salt and the initiator in the curable polymer and/or monomer;

spraying the mixture; and while spraying, curing the curable polymer and/or monomer to form a plurality of ionically conductive particles.

2. The method of claim 1, wherein the mixture further comprises a plurality of inorganic solid and/or electroactive material particles uniformly dispersed in the mixture.

3. The method of claim 2, wherein the plurality of inorganic solid particles comprises one or more selected from the group of ionically conductive or non-ionically conductive ceramics or glasses.

4. The method of claim 2, wherein the electroactive material particles comprise at least one selected from the group of lithium cobalt oxide, lithium nickel manganese cobalt oxide, lithium manganese cobalt oxide, lithium iron phosphate, lithium manganese iron phosphate, lithium nickel cobalt aluminum oxide, lithium titanate, lithium manganese oxide, lithium manganese nickel oxide, graphite, silicon, and sulfur.

5. The method of claim 2, wherein the electroactive material particles comprise at least one selected from the group of Prussian Blue, Prussian Blue analogs, and Prussian White.

6. The method of claim 2, wherein the inorganic solid particles comprise ionically conducting metal oxides selected from at least one selected from the group of $Al_2O_3$, $SiO_2$, $TiO_2$, MgO, ZnO, $ZrO_2$, CuO, CdO, $Li_7La_3Zr_2O_{12}$, and $Li_2O$.

7. The method of claim 1, wherein the mixture further comprises a solvent.

8. The method of claim 7, further comprising evaporating the solvent while curing the curable polymer and/or monomer.

9. The method of claim 1, wherein the curable polymer comprises at least one selected from the group of polyvinylidene fluoride, polyethylene glycol, polyvinyl acetate, poly(vinylidene fluoride-co-hexafluoropropylene), polytetrafluoroethylene, styrene-butadiene, polyethylene oxide, polyacetylene, polyphenylene, polypyrrole, polythiophene, polyaniline, polyphenylene sulfide, poly(vinyl alcohol), polyethylenimine, poly(vinylpyrrolidone), poly(ethylene carbonate), and poly(propylene carbonate).

10. The method of claim 1, wherein the ionically conductive salt comprises at least one selected from the group of $LiClO_4$, $LiBF_4$, $LiPF_6$, $LiAsF_6$, LIFSI, LiTFSI, LiBETI, LiCTFSI, LiBOB, LIDFOB, LiTDI, LIPDI, LiDCTA, $LiNO_3$, LiCl, LiI, and $LiB(CN)_4$.

11. The method of claim 1, wherein the curing comprises exposing the spray to heat and/or electromagnetic radiation while in-flight.

12. The method of claim 1, wherein the curable polymer and/or monomer comprises a photo-curable polymer and/or monomer.

13. The method of claim 1, wherein the curable polymer comprises polyethylene glycol and/or polyethylene oxide.

14. The method of claim 1, wherein the mixture further comprises a carbonate-based polymer and/or additive.

15. The method of claim 1, wherein ionically conductive salt comprises a fluorinated salt.

16. A method comprising:

spraying a plurality of ionically conductive particles according to claim 1;

applying a charge to the spray of ionically conductive particles;

heating a substrate; and applying the charged spray of ionically conductive particles to the heated substrate to form a film of the ionically conductive particles on the substrate.

17. A method of claim 16, wherein the substrate is heated using resistive heating, conductive heating, convective heating, and/or radiative heating of the substrate.

18. A method, comprising:

combining a thermoplastic polymer, an ionically conductive salt, and a solvent to form a mixture;

dissolving the ionically conductive salt and thermoplastic polymer in the solvent; and spraying the mixture, wherein the solvent evaporates while the mixture is being sprayed to form a plurality of ionically conductive particles, and wherein the thermoplastic polymer is crosslinked while the mixture is sprayed.

19. The method of claim 18, wherein the mixture further comprises a plurality of inorganic solid and/or electroactive material particles uniformly dispersed in the thermoplastic polymer.

20. The method of claim 19, wherein a weight percentage of the plurality of inorganic solid particles is greater than or equal to 60 wt % of the mixture.

21. The method of claim 19, wherein the electroactive material particles comprise at least one selected from the group of lithium cobalt oxide, lithium nickel manganese cobalt oxide, lithium manganese cobalt oxide, lithium iron phosphate, lithium manganese iron phosphate, lithium nickel cobalt aluminum oxide, lithium titanate, lithium manganese oxide, lithium manganese nickel oxide, graphite, silicon, sulfur, Prussian Blue, Prussian Blue analogs, and Prussian White.

22. The method of claim 19, wherein the inorganic solid particles comprise ionically conducting metal oxides selected from at least one selected from the group of $Al_2O_3$, $SiO_2$, $TiO_2$, MgO, ZnO, $ZrO_2$, CuO, CdO, $Li_7La_3Zr_2O_{12}$ and $Li_2O$.

23. The method of claim 19, wherein the plurality of inorganic solid particles comprises lithium-ion conducting additives selected from the group of non-lithiated ceramics and/or non-lithiated glass.

24. The method of claim 18, wherein the plurality of ionically conductive particles are substantially free from the solvent.

25. The method of claim 24, wherein the plurality of ionically conductive particles comprises a solvent and/or moisture content of less than or equal to 0.5 wt %.

26. The method of claim 18, wherein the thermoplastic polymer comprises at least one selected from the group of polyvinylidene fluoride, polyethylene glycol, polyvinyl acetate, poly(vinylidene fluoride-co-hexafluoropropylene), polytetrafluoroethylene, styrene-butadiene, polyethylene oxide, polyacetylene, polyphenylene, polypyrrole, polythiophene, polyaniline, polyphenylene sulfide, poly(vinyl alcohol), polyethylenimine, poly(vinylpyrrolidone), poly(ethylene carbonate), and poly(propylene carbonate).

27. The method of claim 18, wherein the ionically conductive salt comprises at least one selected from the group of $LiClO_4$, $LiBF_4$, $LiPF_6$, $LiAsF_6$, LiFSI, LiTFSI, LiBETI, LICTFSI, LiBOB, LIDFOB, LiTDI, LIPDI, LiDCTA, $LiNO_3$, LiCl, LiI, and $LiB(CN)_4$.

28. The method of claim 18, wherein a weight percentage of the ionically conductive salt is greater than or equal to 50 wt % relative to a total weight of the thermoplastic polymer.

* * * * *